US012739132B2

(12) United States Patent
Prabhakar et al.

(10) Patent No.: US 12,739,132 B2
(45) Date of Patent: Sep. 15, 2026

(54) METHODS, SYSTEMS AND COMPUTER PROGRAM PRODUCTS FOR SECURE ONLINE VERIFICATION OF IDENTITY AND PRESENCE

(71) Applicant: OptiML Vision Inc., Newark, CA (US)

(72) Inventors: Salil Prabhakar, Fremont, CA (US); Alexander Ivanisov, Newark, CA (US)

(73) Assignee: OPTIML VISION INC., Newark, CA (US)

( * ) Notice: Subject to any disclaimer, the term of this patent is extended or adjusted under 35 U.S.C. 154(b) by 0 days.

(21) Appl. No.: 19/355,803

(22) Filed: Oct. 10, 2025

(65) Prior Publication Data

US 2026/0039479 A1 Feb. 5, 2026

(51) Int. Cl.
*H04L 9/32* (2006.01)
*H04L 9/08* (2006.01)

(52) U.S. Cl.
CPC .......... *H04L 9/3247* (2013.01); *H04L 9/0861* (2013.01); *H04L 9/3231* (2013.01)

(58) Field of Classification Search
CPC .... H04L 9/3247; H04L 9/0861; H04L 9/3231
See application file for complete search history.

(56) References Cited

U.S. PATENT DOCUMENTS

| | | | | |
|---|---|---|---|---|
| 8,289,135 | B2 * | 10/2012 | Griffin | G06F 21/32 340/5.82 |
| 10,142,333 | B1 * | 11/2018 | Griffin | H04L 9/3231 |
| 10,277,400 | B1 * | 4/2019 | Griffin | H04L 9/3231 |
| 10,373,148 | B1 * | 8/2019 | Dixon | G06Q 20/22 |
| 10,769,634 | B2 * | 9/2020 | Azzam | G06Q 20/4016 |
| 11,075,759 | B2 * | 7/2021 | Kong | G06V 40/12 |
| 11,303,452 | B2 * | 4/2022 | Cohen | H04L 63/0861 |
| 11,321,445 | B2 * | 5/2022 | Arora | H04L 9/0891 |
| 11,418,347 | B1 * | 8/2022 | Griffin | H04L 9/30 |
| 11,651,361 | B2 * | 5/2023 | Edwards | G06Q 20/4014 705/71 |
| 2003/0115475 | A1 * | 6/2003 | Russo | H04L 9/3231 713/186 |
| 2010/0201498 | A1 * | 8/2010 | Griffin | G06F 21/32 340/10.52 |

(Continued)

OTHER PUBLICATIONS

Smejkal, Vladimír, and Jindřich Kodl. “Strong authentication using dynamic biometric signature.” 2011 Carnahan Conference on Security Technology. IEEE, 2011. (Year: 2011).*

(Continued)

*Primary Examiner* — Theodore C Parsons
*Assistant Examiner* — Sameera Wickramasuriya
(74) *Attorney, Agent, or Firm* — Budzyn IP Law, LLC

(57) ABSTRACT

The present invention relates to the domain of digital identity verification and presence verification. More particularly the invention provides identity verification methods and systems for verifying the identity of an individual associated with a trusted credential or a trusted credential data object. The trusted credential is stored on or is accessible at or through a user device—and has been generated by a trusted credential system that is distinct from (and that is located remotely from) the user device, while simultaneously verifying in real time, the live presence of the individual associated with the trusted credential, at the user device.

21 Claims, 11 Drawing Sheets

(56) References Cited

U.S. PATENT DOCUMENTS

2010/0205452 A1* 8/2010 Griffin .................. H04L 9/3231 713/186
2012/0240204 A1* 9/2012 Bhatnagar ................. H04L 9/32 726/5
2013/0174243 A1* 7/2013 Inatomi ................. H04L 9/3231 726/7
2014/0015930 A1* 1/2014 Sengupta .............. G06F 21/316 348/46
2017/0161578 A1* 6/2017 Ivanisov ................ G06V 40/40
2020/0177584 A1* 6/2020 Wajs ....................... G06F 21/32
2021/0097166 A1* 4/2021 Arora .................... H04L 9/0891
2023/0086191 A1* 3/2023 Jakobsson ............. H04L 9/3231 705/66
2023/0177489 A1* 6/2023 Chan .................. G06Q 20/3672 705/66
2023/0252121 A1* 8/2023 Prabhakar ............... G06F 21/32 713/186

OTHER PUBLICATIONS

N. R. Darve and D. P. Theng, "Comparison of biometric and non-biometric security techniques in mobile cloud computing," 2015 2nd International Conference on Electronics and Communication Systems (ICECS), Coimbatore, India, 2015 (Year: 2015).*

* cited by examiner

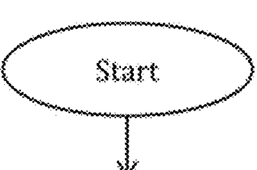

Obtaining a set of information, wherein the set of information comprises or has been derived from a set of transmission data that has been transmitted from the user device subsequent to performance of a set of user identity verification steps (that are shown in Figure 5) at the user device

302

Initiate a state change in a device or system, wherein (i) the state change (or a changed state arising from the state change) is conditioned on, a determination that a set of state change requirements are met, and (ii) the determination that a set of state change requirements are met, relies on data within the set of information obtained at step 302

304

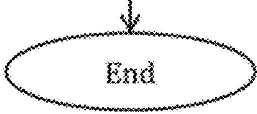

Figure 3

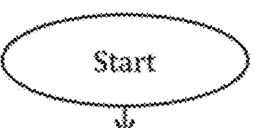

Obtaining at the user device, a set of credential data associated with an individual, the set of credential data comprising biometric data associated with the individual — 502

Obtaining at the user device, a digital signature issued by a trusted credential system, wherein the digital signature has been generated by cryptographically signing any of the (i) biometric data or a subset thereof or data derived therefrom, (ii) attribute data within the set of credential data, wherein the attribute data represents one or more attributes associated with the individual, or a subset of said attribute data or data derived therefrom — 504 obtaining at the user device, live biometric sample data, wherein the live biometric sample data is obtained or derived from a biometric sample acquired from the individual using a biometric sample acquisition sensor that is operated by or controlled by or communicably coupled with the user device — 506 comparing the live biometric sample data with reference biometric data, wherein the reference biometric data comprises any of (i) biometric data within the set of credential data obtained at step 502, or (ii) biometric data that is verifiably linked with or derived from the biometric data within the set of credential data obtained at step 502 — 508

Transmitting a set of transmission data (for example to an identity verification system) subsequent to a positive biometric match result at step 508, wherein the set of transmission data (i) includes, is derived from, or has been generated based on, data within any of the set of credential data or the digital signature, or (ii) includes data that has been generated based on a result of one or more data operations involving any of the set of credential data or the digital signature — 510

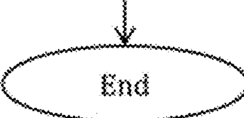

Figure 5

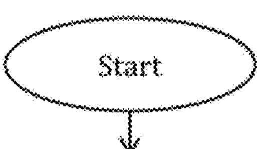

Determining whether the set of information received from the user device satisfies one or more predefined credential data requirements associated with the state change — 702

Verifying authenticity of any data from the set of credential data, wherein the verification is performed using the digital signature — 704

Initiating a state change in a device or a system, wherein the state change (or a changed state arising from the state change) is conditioned upon (i) a determination (at step 702) that the set of information received from the user device satisfies one or more predefined credential data requirements associated with the state change, and (ii) a positive result (at step 704) from verification of authenticity of any data from the set of credential data, wherein the verification has been performed using the digital signature — 706

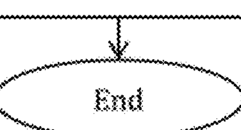

Figure 7

METHODS, SYSTEMS AND COMPUTER PROGRAM PRODUCTS FOR SECURE ONLINE VERIFICATION OF IDENTITY AND PRESENCE

FIELD OF THE INVENTION

The present invention relates to digital identity verification, and presence verification. More particularly the invention provides methods and systems for verifying the identity of an individual associated with a trusted credential or a trusted credential data object that has been generated by a trusted credential system and which is accessible at or through a remote device, while simultaneously verifying in real time, live presence of said individual at the remote device.

BACKGROUND

With the widely increased use of online and network based technologies, there has been a need for digital identity and presence verification solutions that enable secure online verification of identity and live presence of an individual.

Existing solutions for digital identity and presence-verification do not provide a unified, privacy-preserving mechanism capable of verifying, in a single process, both (i) the authenticity of identity data contained in a trusted credential that is accessible at or through a remote device, and (ii) the live, real-time presence of the rightful bearer of that trusted credential at the remote device.

In existing systems, these assurances are achieved separately, if at all, and typically at the cost of either privacy, portability, or independence from centralized infrastructure.

In one prior art approach, selfie-and-ID-scan workflows attempt to bind an identity document to a live person, but the authenticity of the document scan is inherently difficult to establish and is unreliable. Forgeries and digitally modified or spoofed documents pose a serious challenge in such solutions.

In another approach, an individual's identity can be established based on a trusted credential that is issued by a trusted authority—for example based on an ePassport or a mobile driver's license (mDL). Trusted credentials such as mDLs and ePassports include a trusted credential data object that can be stored on, or that can be accessed at or through a user device via a digital wallet (or other software application) implemented at the user device. Data within the trusted credential data object includes cryptographic data that enables the user device to confirm that the trusted credential is valid and unaltered.

However such solutions suffer from a drawback in that they fail to verify whether the live individual operating or present at the user device is in fact the authorized bearer of, or is the individual associated with, the trusted credential. In absence of a mechanism to verify whether the live individual operating or present at the user device is in fact the person associated with, or the authorized bearer of, the trusted credential, receiving a trusted credential data object (or data extracted from or generated based on the trusted credential data object) from that user device is by itself unhelpful for determining whether to grant the user access to an access-controlled resource, since such data cannot in any way confirm the identity of the live individual actually operating or present at the user device.

Still further, by allowing transmission of a trusted credential data object (or data that has been extracted from or generated based on a trusted credential data object) to third parties, wallet-based systems enable retransmission of personal data (that is stored within the trusted credential data object) to third parties or remote entities that the individual with whom the trusted credential is associated, may not know or approve of. Once transmitted, such personal data may be stored, aggregated, or used beyond the expectation or consent of the concerned individual. The risk of exposure of personal data means that existing solutions for verification of identity have an inherent risk of permanent surrender of personal data to entities that the individual (with whom that personal data is associated) neither selected nor consented to.

Similar problems are inherent in multi-factor authentication (MFA) based identity verification mechanisms (e.g. mechanisms which rely on SMS codes, authenticator applications, passkeys, and hardware tokens). At best, such mechanisms can prove that someone is in possession of a registered user device and is operating the registered user device to meet the multi-factor authentication requirement. These mechanisms do not in any way enable a determination that the person who is in possession of (or who is operating) a registered user device is the legitimate bearer of a trusted credential.

Other embodiments of device-based authentication systems include systems that implement biometric based unlock features-which can be used to confirm device possession as well as a local biometric match. However, such devices rely on self-enrolled biometrics, rather than on biometrics linked to a trusted credential. Such solutions therefore cannot assure that the individual who is in possession of, or who is operating, a registered user device, is in fact the individual to whom a trusted credential corresponds. Additionally, because enrolment is self-administered rather than verified against a credential issued by a trusted source, such biometrics remain vulnerable to substitution at setup by an imposter.

Centralized high-assurance identity verification services (such as CLEAR™ or Amazon One™) can combine strong identity verification with presence assurance. However these operate under a centralized trust model, in which every verifier must rely upon the central provider's infrastructure and processes. Similarly, hub-and-spoke federated identity architectures, such as certain SAML or OAuth deployments require every relying party ("spoke") to trust a single identity provider ("hub"). In both cases, this creates operational and business bottlenecks, a single point of failure, and a high-value target for attackers. For example, in the context of a bank serving millions of customers, each branch or online service depends on the central hub for verification; if the hub is unavailable, compromised, or no longer trusted, the entire network's ability to verify identity and presence collapses. Furthermore, due to their centralized nature, they create a honeypot of personal data and associated risks of aggregation, misuse, and breach.

Existing solutions for digital identity and presence-verification therefore do not provide a unified, efficient and privacy-preserving mechanism capable of verifying both (i) the authenticity of data contained in a trusted credential data object that is accessible at a user device, and (ii) the live, real-time presence of the rightful bearer of that trusted credential at the user device.

Further, the existing state of the art does not enable solutions that allow any verifier, anywhere, to confirm both the authenticity of biometric or attribute data in a trusted credential data object as well as the live presence of the rightful bearer, (i) without contacting a central authority, (ii) without exposing unnecessary personal data, and (iii) without relying on self-enrolled biometric references, or hub-and-spoke type verification involving real time retrieval of centrally stored biometric references.

There is accordingly a need for a solution that addresses the above drawbacks in the existing state of the art.

SUMMARY

The present invention relates to the domain of digital identity verification and presence verification. More particularly the invention provides identity verification methods and systems for verifying the identity of an individual associated with a trusted credential or a trusted credential data object. The trusted credential is stored on or is accessible at or through a user device—and has been generated by a trusted credential system that is distinct from (and that is located remotely from) the user device, while simultaneously verifying in real time, the live presence of the individual associated with the trusted credential, at the user device.

The invention provides a computer-implemented method for initiating a state change in a device or system based on information representing verified live presence of an individual. The method comprises, performing at a computing system, the steps of (1) obtaining a set of information, wherein the set of information comprises or is derived from a set of transmission data that has been transmitted from a user device subsequent to performance of the steps of (a) obtaining at the user device, a set of credential data associated with an individual, the set of credential data comprising biometric data associated with the individual, (b) obtaining at the user device, a first digital signature provided by a trusted entity, wherein the first digital signature has been generated by cryptographically signing any of the (i) biometric data or a subset thereof or data derived therefrom, (ii) attribute data within the set of credential data, wherein the attribute data represents one or more attributes associated with the individual, or a subset of said attribute data or data derived therefrom, (c) obtaining at the user device, live biometric sample data, wherein the live biometric sample data is obtained or derived from a biometric sample acquired from the individual using a biometric sample acquisition sensor that is operated by or controlled by or communicably coupled with the user device, (d) comparing the live biometric sample data with reference biometric data, wherein the reference biometric data comprises any of (iii) biometric data within the set of credential data obtained at step (a), or (iv) biometric data that is verifiably linked with or derived from the biometric data within the set of credential data obtained at step (a), (e) transmitting the set of transmission data to the computing system subsequent to a positive biometric match result at step (d), wherein the set of transmission data (v) includes, is derived from, or has been generated based on data within any of the set of credential data or the first digital signature or (vi) has been generated based on a result of one or more data operations involving any of the set of credential data or the first digital signature, and (2) initiating the state change in a device or a system, wherein the state change is conditioned upon, or a changed state arising from the state change is based on (f) a determination that the set of information satisfies one or more predefined credential data requirements associated with the state change, and (g) a positive result from verification of authenticity of any data from the set of credential data, wherein the verification is performed using the first digital signature.

In an embodiment of the method, the computing system is distinct from the user device, or is logically isolated from the user device, or is located remotely from the user device.

In another embodiment of the method, (1) the user device generates a second digital signature by cryptographically signing a second set of data, (2) the change in the state is further conditioned upon, or the changed state arising from the state change is further based on, a positive verification result of the second digital signature, and (3) the set of information comprises the second digital signature.

In an embodiment of this method, the second set of data is based on, derived from, or contingent upon any data from the set of credential data or the first digital signature.

In a more particular embodiment of the method, (1) the second digital signature is generated using a cryptographic key associated by an attestation service with the user device or with an application implemented on the user device, and (2) initiating the state change is further conditioned upon, or the changed state arising from the state change is further based on, a verification of authenticity of the cryptographic key using attestation data associated with the user device or the application.

In another method embodiment, the initiation of the state change is further conditioned upon, or the changed state arising from the state change is further based on (1) the user device, or an application thereon, proving control of an attested cryptographic key by correctly performing a cryptographic operation, and on verification of said key using attestation data, or (2) the result of a secure multiparty computation performed based on (a) the set of credential data obtained at the user device or a derivative thereof, and (b) a set of reference data accessible in a computer system distinct from the user device or a derivative thereof, wherein the result is conditioned upon, or indicative of, a match between the credential data and the reference data.

In another method embodiment, (1) the trusted entity comprises any of a governmental entity, a national identity provider, a state agency, a financial institution, an educational institution, a healthcare provider, a private enterprise, or an identity provider, and (2) the first digital signature has been generated by cryptographically signing data included in any of an electronic passport, a mobile driver's license (mDL), a national identity card, a government-issued employee or contractor credential, a photo identification credential, a verifiable credential, a decentralized identifier (DID), or a QR-code-based identity credential.

In a method embodiment, (1) the set of information is restricted for use within one or more specific contexts by cryptographically binding the set of information to one or more context-specific inputs, and (2) each context-specific input comprises any of a computing system identifier, a challenge value, a nonce, a session identifier, a timestamp, a device identifier, a geographic location, or a network address.

In a particular embodiment of the method, the set of information comprises, or is generated using, one or more of (1) an identity attribute, an attribute-level assertion, or a pseudonymous identifier, including a pseudonymous identifier that supports continuity across multiple interactions, (2) data representing a scope of access, permission, or eligibility associated with the individual or the user device, said data comprising any of an access token, authentication token, authorization code, a cryptographic key, account identifier, passkey, or payment credential, or credentials or one or more keys previously stored on the user device and released conditionally based on user intent or policy, (3) a cryptographic proof, comprising a zero-knowledge proof of possession or control of a credential, attribute, or identity assertion, wherein said cryptographic proof omits or masks the credential, attribute, or identity, (4) a biometrically-derived identifier or other user-associated data accessible to the user device, (5) a selectively disclosed subset of the credential data initially obtained at the user device, wherein selective disclosure of said subset of the credential data is performed based on a request, policy, or user preference, and (6) a verifiable assertion, token, or credential formatted for compatibility with one or more standard authentication, authorization, or identity verification protocols.

In another embodiment the method further comprises, performing at the computing system or an associated authorization system, the steps of (1) receiving the set of information, (2) verifying the authenticity of the information, including verifying at least one of: a cryptographic signature, attestation data, or a cryptographic proof of possession of a credential, (3) determining, based on the verified information, whether to grant access to a resource, authorize a transaction, complete a digital interaction, or trigger a contextual action, and (4) in response to a positive determination based on the verified information, performing one or more of (a) causing a client interface associated with the individual to navigate to, or activate, one or more resources, services, transactions, application states, or interactions, (b) processing a payment or transaction, (c) permitting access to gated content, services, or systems, (d) recording a notarized, signed, or otherwise verified digital action, and (e) linking or activating an account, credential, or verified identity state, including during account creation or upon receipt of the information—wherein the state change is initiated in response to an input, trigger, or contextual condition, the input, trigger, or contextual condition including any of scanning a code, tapping a link, responding to a notification, or interacting with a physical interface, wherein the input, trigger or condition facilitates or requests use of the set of information.

The invention also provides a system for initiating a state change in a device or system based on information representing verified live presence of an individual. The system comprises a computing system configured to perform the steps of (1) obtaining a set of information, wherein the set of information comprises or is derived from a set of transmission data that has been transmitted from a user device subsequent to performance of the steps of (a) obtaining at the user device, a set of credential data associated with an individual, the set of credential data comprising biometric data associated with the individual, (b) obtaining at the user device, a first digital signature provided by a trusted entity, wherein the first digital signature has been generated by cryptographically signing any of the (i) biometric data or a subset thereof or data derived therefrom, (ii) attribute data within the set of credential data, wherein the attribute data represents one or more attributes associated with the individual, or a subset thereof or data derived therefrom, (c) obtaining at the user device, live biometric sample data, wherein the live biometric sample data is obtained or derived from a biometric sample acquired from the individual using a biometric sample acquisition sensor that is operated by or controlled by or communicably coupled with the user device, (d) comparing the live biometric sample data with reference biometric data, wherein the reference biometric data comprises any of (iii) biometric data within the set of credential data obtained at step (a), or (iv) biometric data that is verifiably linked with or derived from the biometric data within the set of credential data obtained at step (a), (c) transmitting the set of transmission data to the computing system subsequent to a positive biometric match result at step (d), wherein the set of transmission data (v) includes, is derived from, or has been generated based on data within any of the set of credential data or the first digital signature or (vi) has been generated based on a result of one or more data operations involving any of the set of credential data or the first digital signature, and (2) initiating the state change in a device or a system, wherein the state change is conditioned upon, or a changed state arising from the state change is based on (f) a determination that the set of information satisfies one or more predefined credential data requirements associated with the state change, and (g) a positive result from verification of authenticity of any data from the set of credential data, wherein the verification is performed using the first digital signature.

In an embodiment of the system, the computing system is distinct from the user device, or is logically isolated from the user device, or is located remotely from the user device.

In another embodiment, (1) the user device generates a second digital signature by cryptographically signing a second set of data, (2) the change in the state is further conditioned upon, or the changed state arising from the state change is further based on, a positive verification result of the second digital signature, and (3) the set of information comprises the second digital signature.

In a particular embodiment of the system, the second set of data is based on, derived from, or contingent upon any data from the set of credential data or the first digital signature.

In an embodiment of the system, (1) the second digital signature is generated using a cryptographic key associated by an attestation service with the user device or with an application implemented on the user device, and (2) initiating the state change is further conditioned upon, or the changed state arising from the state change is further based on, a verification of authenticity of the cryptographic key using attestation data associated with the user device or the application.

In a further embodiment of this system, the computing system is configured such that the initiation of the state change is further conditioned upon, or the changed state arising from the state change is further based on (1) the user device, or an application thereon, proving control of an attested cryptographic key by correctly performing a cryptographic operation, and verification of said key using attestation data, or (2) the result of a secure multiparty computation performed based on (a) the set of credential data obtained at the user device or a derivative thereof, and (b) a set of reference data accessible in a computer system distinct from the user device or a derivative thereof, wherein the result is conditioned upon, or indicative of, a match between the credential data and the reference data.

In another embodiment of the system, (1) the trusted entity comprises any of a governmental entity, a national identity provider, a state agency, a financial institution, an educational institution, a healthcare provider, a private enterprise, or an identity provider, and (2) the first digital signature has been generated by cryptographically signing data included in any of an electronic passport, a mobile driver's license (mDL), a national identity card, a government-issued employee or contractor credential, a photo identification credential, a verifiable credential, a decentralized identifier (DID), or a QR-code-based identity credential.

In a system embodiment (1) the set of information is restricted for use within one or more specific contexts by cryptographically binding the set of information to one or more context-specific inputs, and (2) each context-specific input comprises any of a computing system identifier, a challenge value, a nonce, a session identifier, a timestamp, a device identifier, a geographic location, or a network address.

In a specific embodiment of the system, the set of information comprises, or is generated using, one or more of (1) an identity attribute, an attribute-level assertion, or a pseudonymous identifier, including a pseudonymous identifier that supports continuity across multiple interactions, (2) data representing a scope of access, permission, or eligibility associated with the individual or the user device, said data comprising any of an access token, authentication token, authorization code, a cryptographic key, account identifier, passkey, or payment credential, or credentials or one or more keys previously stored on the user device and released conditionally based on user intent or policy, (3) a cryptographic proof, comprising a zero-knowledge proof of possession or control of a credential, attribute, or identity assertion, wherein said cryptographic proof omits or masks the credential, attribute, or identity, (4) a biometrically-derived identifier or other user-associated data accessible to the user device, (5) a selectively disclosed subset of the credential data initially obtained at the user device, wherein selective disclosure of said subset of the credential data is performed based on a request, policy, or user preference, and (6) a verifiable assertion, token, or credential formatted for compatibility with one or more standard authentication, authorization, or identity verification protocols.

In an embodiment of the system, the computing system or an associated authorization system is configured to perform the steps of (1) receiving the set of information, (2) verifying the authenticity of the information, including verifying at least one of: a cryptographic signature, attestation data, or a cryptographic proof of possession of a credential, (3) determining, based on the verified information, whether to grant access to a resource, authorize a transaction, complete a digital interaction, or trigger a contextual action, and (4) in response to a positive determination based on the verified information, performing one or more of (a) causing a client interface associated with the individual to navigate to, or activate, one or more resources, services, transactions, application states, or interactions, (b) processing a payment or transaction, (c) permitting access to gated content, services, or systems, (d) recording a notarized, signed, or otherwise verified digital action, and (e) linking or activating an account, credential, or verified identity state, including during account creation or upon receipt of the information—wherein the state change is initiated in response to an input, trigger, or contextual condition, the input, trigger, or contextual condition including any of scanning a code, tapping a link, responding to a notification, or interacting with a physical interface, wherein the input, trigger or condition facilitates or requests use of the set of information.

The invention additionally provides a computer program product for initiating a state change in a device or system based on information representing verified live presence of an individual. The computer program product comprises a non-transitory computer usable medium having a computer readable program code embodied therein, the computer readable program code comprising instructions for performing at a computing system, the steps of (1) obtaining a set of information, wherein the set of information comprises or is derived from a set of transmission data that has been transmitted from a user device subsequent to performance of the steps of (a) obtaining at the user device, a set of credential data associated with an individual, the set of credential data comprising biometric data associated with the individual, (b) obtaining at the user device, a first digital signature provided by a trusted entity, wherein the first digital signature has been generated by cryptographically signing any of the (i) biometric data or a subset thereof or data derived therefrom, (ii) attribute data within the set of credential data, wherein the attribute data represents one or more attributes associated with the individual, or a subset of said attribute data or data derived therefrom, (c) obtaining at the user device, live biometric sample data, wherein the live biometric sample data is obtained or derived from a biometric sample acquired from the individual using a biometric sample acquisition sensor that is operated by or controlled by or communicably coupled with the user device, (d) comparing the live biometric sample data with reference biometric data, wherein the reference biometric data comprises any of (iii) biometric data within the set of credential data obtained at step (a), or (iv) biometric data that is verifiably linked with or derived from the biometric data within the set of credential data obtained at step (a), (c) transmitting the set of transmission data to the computing system subsequent to a positive biometric match result at step (d), wherein the set of transmission data (v) includes, is derived from, or has been generated based on data within any of the set of credential data or the first digital signature or (vi) has been generated based on a result of one or more data operations involving any of the set of credential data or the first digital signature, and (2) initiating the state change in a device or a system, wherein the state change is conditioned upon, or a changed state arising from the state change is based on (f) a determination that the set of information satisfies one or more predefined credential data requirements associated with the state change, and (g) a positive result from verification of authenticity of any data from the set of credential data, wherein the verification is performed using the first digital signature.

The invention provides a further method for initiating a state change in a device or system based on information representing verified live presence of an individual. The method comprises the steps of (1) obtaining at a user device, a set of credential data associated with an individual, the set of credential data comprising biometric data associated with the individual, (2) obtaining at the user device, a first digital signature provided by a trusted entity, wherein the first digital signature has been generated by cryptographically signing any of the (a) biometric data or a subset thereof or data derived therefrom, (b) attribute data within the set of credential data, wherein the attribute data represents one or more attributes associated with the individual, or a subset of said attribute data or data derived therefrom, (3) obtaining at the user device, live biometric sample data, wherein the live biometric sample data is obtained or derived from a biometric sample acquired from the individual using a biometric sample acquisition sensor that is operated by or controlled by or communicably coupled with the user device, (4) comparing the live biometric sample data with reference biometric data, wherein the reference biometric data comprises any of (c) biometric data within the set of credential data obtained at step (1), or (d) biometric data that is verifiably linked with or derived from the biometric data within the set of credential data obtained at step (1); and (5) transmitting a set of transmission data to a computing system subsequent to a positive biometric match result at step (4), wherein the set of transmission data (c) includes, is derived from, or has been generated based on data within any of the set of credential data or the first digital signature or (f) has been generated based on a result of one or more data operations involving any of the set of credential data or the first digital signature.

In an embodiment, of this method, the computing system is configured to respond to receipt of the set of transmission data by (1) obtaining a set of information, wherein the set of information comprises or is derived from the set of transmission data, and (2) initiating a state change in a device or a system, wherein the state change is conditioned upon, or a changed state arising from the state change is based on (a) a determination that the set of information satisfies one or more predefined credential data requirements associated with the state change, and (b) a positive result from verification of authenticity of any data from the set of credential data, wherein the verification is performed using the first digital signature.

The invention also provides another system for initiating a state change in a device or system based on information representing verified live presence of an individual. The system comprises a user device configured to perform the steps of (1) obtaining a set of credential data associated with an individual, the set of credential data comprising biometric data associated with the individual, (2) obtaining a first digital signature provided by a trusted entity, wherein the first digital signature has been generated by cryptographically signing any of the (a) biometric data or a subset thereof or data derived therefrom, (b) attribute data within the set of credential data, wherein the attribute data represents one or more attributes associated with the individual, or a subset of said attribute data or data derived therefrom, (3) obtaining live biometric sample data, wherein the live biometric sample data is obtained or derived from a biometric sample acquired from the individual using a biometric sample acquisition sensor that is operated by or controlled by or communicably coupled with the user device, (4) obtaining a biometric match result from a comparison between the live biometric sample data and reference biometric data, wherein the reference biometric data comprises any of (c) biometric data within the set of credential data obtained at step (1), or (d) biometric data that is verifiably linked with or derived from the biometric data within the set of credential data obtained at step (1), and (5) transmitting a set of transmission data to a computing system subsequent to the biometric match result obtained at step (4) comprising a positive biometric match result, wherein the set of transmission data (c) includes, is derived from, or has been generated based on data within any of the set of credential data or the first digital signature or (f) has been generated based on a result of one or more data operations involving any of the set of credential data or the first digital signature.

In an embodiment of the system, the computing system is configured to respond to receipt of the set of transmission data by (1) obtaining a set of information, wherein the set of information comprises or is derived from the set of transmission data, and (2) initiating a state change in a device or a system, wherein the state change is conditioned upon, or a changed state arising from the state change is based on (a) a determination that the set of information satisfies one or more predefined credential data requirements associated with the state change, and (b) a positive result from verification of authenticity of any data from the set of credential data, wherein the verification is performed using the first digital signature.

The invention also provides another computer program product for initiating a state change in a device or system based on information representing verified live presence of an individual. The computer program product comprises a non-transitory computer usable medium having a computer readable program code embodied therein. The computer readable program code comprises instructions for performing at a computing system, the steps of (1) obtaining at a user device, a set of credential data associated with an individual, the set of credential data comprising biometric data associated with the individual, (2) obtaining at the user device, a first digital signature provided by a trusted entity, wherein the first digital signature has been generated by cryptographically signing any of the (a) biometric data or a subset thereof or data derived therefrom, (b) attribute data within the set of credential data, wherein the attribute data represents one or more attributes associated with the individual, or a subset of said attribute data or data derived therefrom, (3) obtaining at the user device, live biometric sample data, wherein the live biometric sample data is obtained or derived from a biometric sample acquired from the individual using a biometric sample acquisition sensor that is operated by or controlled by or communicably coupled with the user device, (4) comparing the live biometric sample data with reference biometric data, wherein the reference biometric data comprises any of (c) biometric data within the set of credential data obtained at step (1), or (d) biometric data that is verifiably linked with or derived from the biometric data within the set of credential data obtained at step (1), (5) transmitting a set of transmission data to a computing system subsequent to a positive biometric match result at step (4), wherein the set of transmission data (e) includes, is derived from, or has been generated based on data within any of the set of credential data or the first digital signature or (f) has been generated based on a result of one or more data operations involving any of the set of credential data or the first digital signature.

In an embodiment of this computer program product, the computing system is configured to respond to receipt of the set of transmission data by (1) obtaining a set of information, wherein the set of information comprises or is derived from the set of transmission data, and (2) initiating a state change in a device or a system, wherein the state change is conditioned upon, or a changed state arising from the state change is based on (a) a determination that the set of information satisfies one or more predefined credential data requirements associated with the state change, and (b) a positive result from verification of authenticity of any data from the set of credential data, wherein the verification is performed using the first digital signature.

BRIEF DESCRIPTION OF THE ACCOMPANYING DRAWINGS

FIG. 3 is a flowchart illustrating a method for implementing identity verification, and conditional state change in a device or system, in accordance with the present invention.

FIG. 5 is a flowchart illustrating a method for implementing the first of the two method steps illustrated in the flowchart of FIG. 3.

FIG. 7 is a flowchart illustrating a method for implementing the second of the two method steps illustrated in the flowchart of FIG. 3.

DETAILED DESCRIPTION

The present invention relates to the domain of digital identity verification and presence verification. More particularly the invention provides identity verification methods and systems for verifying the identity of an individual associated with a trusted credential or a trusted credential data object. The trusted credential is stored on or is accessible at or through a user device- and has been generated by a trusted credential system that is distinct from (and that is located remotely from) the user device, while simultaneously verifying in real time, the live presence of the individual associated with the trusted credential, at the user device.

Figure 1:
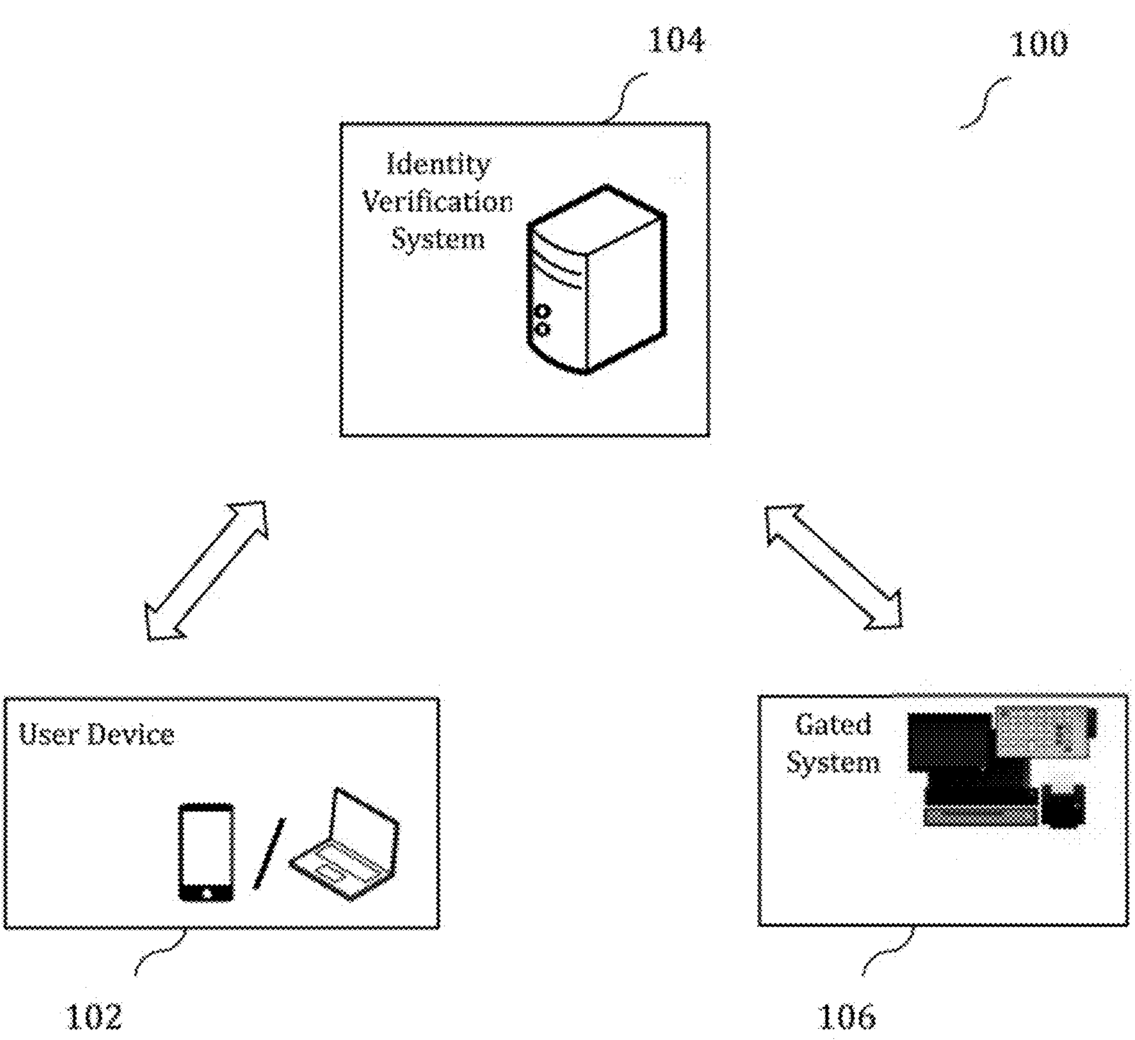
FIG. 1 illustrates a prior art system that enables an identity verification system to verify identity of an individual based on identity data received from a user device.

FIG. 1 illustrates a conventional system that enables an identity verification system to verify the identity of an individual based on identity data received from a user device. System environment 100 comprises a user device 102, an identity verification system 104 and a gated system 106.

User device 102 may comprise any processor based electronic communication device or communication terminal that is configured to implement data processing functionality, network communication functionality and/or wireless communication functionality. In various non-limiting embodiments, user device 102 may comprise any of a portable computer, tablet computer, phablet, cellular phone, smartphone, personal digital assistant, a wearable device such as a smartwatch, smart glasses, smart lenses, smart clothing or the like, or any other portable communication device configured to implement data processing functionality, network communication functionality and/or wireless communication functionality.

User device 102 may be configured to transmit user identity data and access authorization data (for example any one or more of user name, password, passkey, one-time-password (OTP), biometric data etc.) associated with an individual seeking access to or access permissions from, a gated system 106.

Identity verification system 104 may comprise any processor based electronic data processing system that is configured to implement data processing functionality, and/or network communication functionality. In an embodiment, identity verification system 104 comprises at least one processor implemented server or data processing device. In another embodiment, identity verification system 104 comprises a plurality of processor implemented servers or a plurality of data processing devices operating in a network configuration or in a distributed computing configuration for implementing the functionality of identity verification system 104.

Identity verification system 104 may be configured to (i) receive, from user device 102, identity data associated with an individual seeking access to or access permissions from gated system 106, and (ii) determine using the identity data (for example, by comparing the received identity data against stored identity data of individuals who are authorized to access or to receive access permissions from gated system 106), whether the individual operating user device 102 is an authorized individual for the purposes of gated system 106. The results of the identity verification may be transmitted to gated system 106.

Gated system 106 may be configured to restrict or control access to a product or service or location or resource. In some embodiments, gated system 106 may be configured to receive from identity verification system 104, a message or signal that communicates a result of an identity verification process implemented at identity verification system 104. Gated system 106 may grant or deny the requested access or permissions based on the result(s) (of the identity verification process) that has been received from identity verification system 104. For example, gated system 106 may (i) grant a requested access or permission if the result received from identity verification system 104 establishes that the individual operating a user device 102 (i.e. who is seeking access or access permission from gated system 106), is authorized to access or to receive access permission from gated system 106, or (ii) deny the requested access or access permission if the result received from identity verification system 104 establishes that said individual operating a user device 102, is not authorized to access or to receive access permission from gated system 106.

In various non-limiting embodiments, gated system 106 may comprise any of a portable computer, tablet computer, phablet, cellular phone, smartphone, personal digital assistant, a point-of-sale terminal, a point-of-sale kiosk, a cash register, a vending machine or vending cabinet, an electronic door lock, a checkpoint device, a security barrier, or a gate control device that controls or selectively permits access of authorized individuals into a restricted access area (e.g. into a venue for a sporting event, a flight, a vehicle rental, a lodging rental, a concert, a performance, a movie, public transport, and so on), or the like.

As described above, systems of the kind described in connection with FIG. 1, are insufficiently reliable, as at best, they confirm that the individual operating user device 102 has access to credentials necessary to receive access to gated system 106. Such systems fail to accurately and consistently enable verification that the live individual operating or present at the user device 102 is in fact legitimately associated with, or is the authorized bearer of the credentials necessary to receive access to or access permissions from gated system 106.

The present invention solves this problem as well as other drawbacks that presently exist, by implementing a solution that relies on trusted credentials generated by a trusted credential system.

For the purposes of this description "trusted credential system" shall be understood to mean a system that is controlled or operated by a trusted entity, wherein the trusted credential system maintains a set of trusted credential records—each trusted credential record (i) corresponding uniquely to one individual registered with or enrolled within the trusted credential system, and (ii) comprising identity data associated with the registered or enrolled individual.

The trusted credential system comprises a server and/or database implemented system that is maintained, operated and/or controlled by any entity ("trusted entity") that is trusted or relied on by an identity verification system. Examples of trusted entities that are capable of being trusted/relied on by identity verification systems include government entities such as a passport issuing authorities, driver's license issuing authorities, national or regional identity proof issuing authorities, any government backed identification issuing authority, or any private party that is trusted to maintain secure and accurate data records that store identity data associated with individuals.

The trusted credential system is configured to generate a trusted credential based on data stored within records of the trusted credential system. Non-limiting examples of trusted credentials are ePassports and mobile driver's licenses (mDLs).

A trusted credential generated by a trusted credential system may include a trusted credential data object-which is a structured data object generated by the trusted credential system. In generating the trusted credential data object, the trusted credential system encapsulates or includes a defined set of data fields that represent identity of an individual to which the trusted credential corresponds, metadata associated with the identity or the individual, and a digital signature that enables validation (i) of the trusted credential data object itself and/or (ii) that the trusted credential data object has been generated by the trusted credential system.

The format of the trusted credential data object that is included within or that corresponds to a trusted credential may be defined or standardized either by the trusted credential system, or by international and/or national bodies—for example, by the International Civil Aviation Organization (ICAO) for ePassports, and by ISO/IEC 18013-5 or American Association of Motor Vehicle Administrators (AAMVA) specifications in the case of mDLs.

For example, in a case where the trusted credential is an ePassport, the trusted credential data object corresponding to the ePassport is organized into "Data Groups" (DGs). Data Group 1 (DG1) includes biographic information such as the holder's name, date of birth, sex, nationality, document number, and expiry date, which correspond to the printed Machine-Readable Zone (MRZ). Data Group 2 (DG2) contains a digital facial image. Additional Data Groups may include fingerprint templates (DG3), iris images (DG4), or optional information such as signature data or additional biometric modalities. In the case of ePassports, each trusted credential data object also includes or is uniquely associated with a Document Security Object (SOD) that contains digital signature over data containing cryptographic hash values of the Data Groups to enable integrity and authenticity verification.

For a mobile driver's license, the trusted credential data object is typically encoded in a defined namespace following ISO/IEC 18013-5 or AAMVA guidelines. Common data fields include full name, date of birth, issuing jurisdiction, document number, address, class of license, restrictions, endorsements, and license expiration date. Optional fields may include portrait image, height, eye color, or other jurisdiction-specific attributes. Metadata fields such as issuance date, update timestamp, and device-bound identifiers may also be included to ensure temporal and contextual accuracy of the trusted credential.

In an embodiment of the invention, each trusted credential data object includes biometric data associated with the individual to which the trusted credential data object (and the corresponding trusted credential) corresponds.

Additionally, each trusted credential data object includes or is accompanied by a digital signature generated by the trusted credential system. The digital signature is generated by cryptographically signing any one or more instances of data within the trusted credential data object. The digital signature enables integrity and authenticity verification of the trusted credential data object and/or corresponding trusted credential.

For example, in the case of an ePassport, the Document Security Object (SOD) within the trusted credential data object includes hash values of all the Data Groups, signed using the private key of the issuing country's Document Signer Certificate. A receiving system/relying party (i.e. any system that receives the ePassport for the purposes of identity verification) verifies the signature using the corresponding public key distributed via the ICAO Public Key Directory (PKD) or other trusted certificate distribution channels. This process enables a determination that the retrieved data has not been altered and originates from the legitimate issuing authority.

Similarly, for mDLs, the issuing authority signs the mobile security object (MSO) containing randomized message digests of the trusted credential data elements using its private key. The receiving system/relying party verifies the signature against the issuer's certificate, which is distributed through a trust framework defined by ISO/IEC 18013-5 or jurisdiction-specific infrastructures. This allows an inspector/receiving system/relying party to cryptographically confirm that the driver license data is genuine, unmodified, and was issued by a recognized government authority.

When a receiving system/relying party receives a trusted credential data object (which includes or is accompanied by a corresponding digital signature generated by the trusted credential system), the receiving system/relying party may use the digital signature to cryptographically verify that the data within the trusted credential data object is genuine, unmodified and has been issued by a trusted credential system.

Thereafter (i.e. upon successful verification of the trusted credential data object using the digital signature), the receiving system/relying party can proceed to extract identity data/attribute data from the trusted credential data object—and to use the extracted identity data/attribute data for any appropriate determination or purpose. Since the contents of the trusted credential data object are now reliably known to be genuine, unmodified and issued by a trusted credential system, these contents can be used with high confidence. For example, data within a trusted credential data object can be used for a biometric check, such as matching portrait or fingerprint template from the trusted credential to a live capture, or may involve cross-checking demographic data such as name or date of birth against a known set of reference data. In this manner, the combination of structured data fields and cryptographic authenticity associated with trusted credential data objects provides a secure and tamper-resistant basis for identity verification.

Accordingly, trusted credential data objects generated by a trusted credential system provide not only identity data necessary to identify an individual or to make an access control decision concerning whether to grant a requesting individual access to an access controlled resource, but simultaneously also ensure that the identity data has not been forged or altered. By using trusted credentials and/or trusted credential data objects as proof of identity of an individual, a relying party can securely establish trust in both the data and the credential holder.

Figure 2:
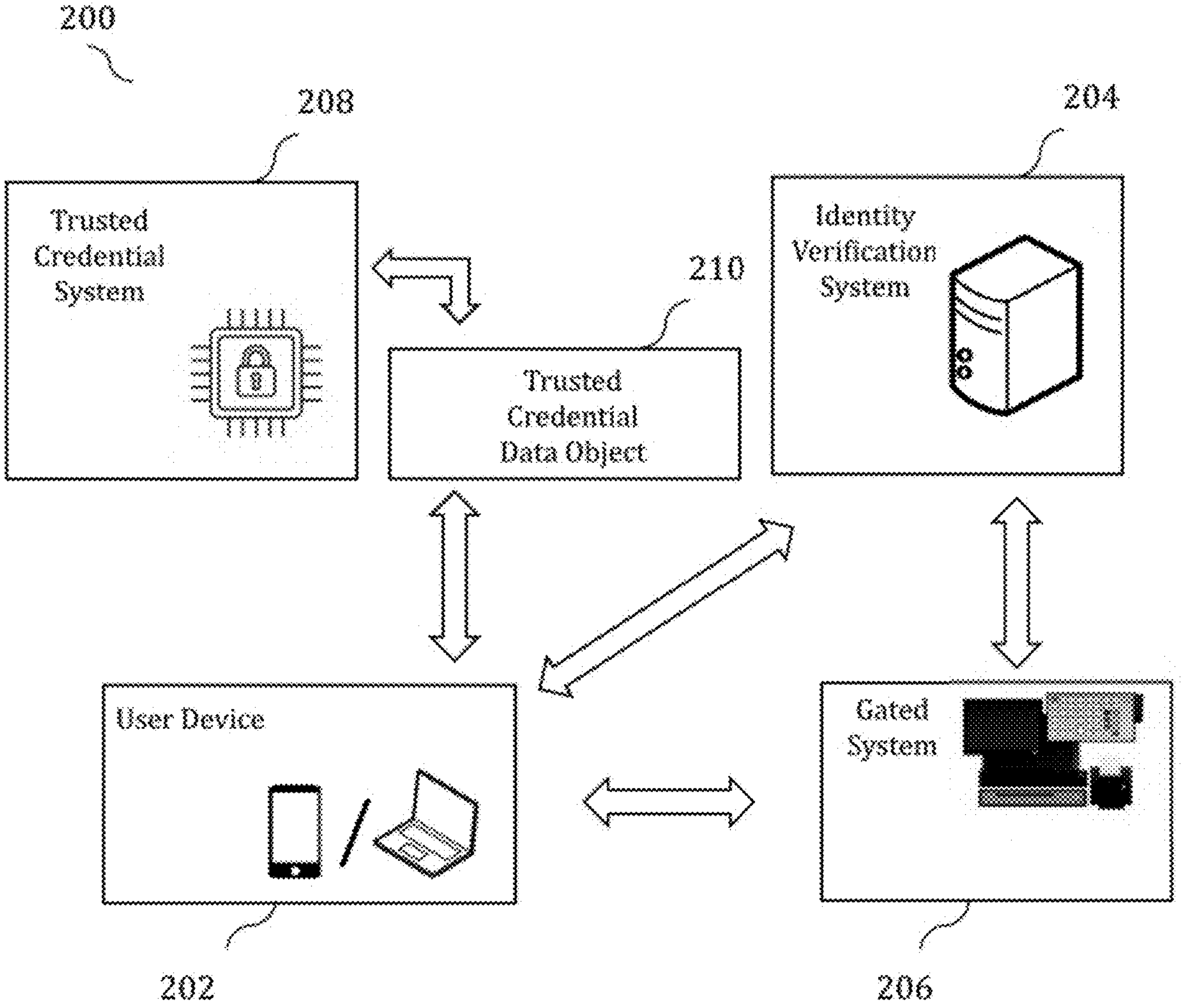
FIG. 2 illustrates a system that enables an identity verification system to verify identity of an individual based on data received from a user device.

FIG. 2 illustrates a system that enables an identity verification system 204 to verify identity and live presence of an individual based on data received from a user device 202, in accordance with the teachings of the present invention.

System environment 200 comprises a user device 202, an identity verification system 204, a gated system 206 and trusted credential system 208 that is configured to generate a unique trusted credential data object 210 associated with each trusted credential generated or maintained by trusted credential system 208.

User device 202 comprises any processor based electronic communication device or communication terminal that is configured to implement data processing functionality, network communication functionality and/or wireless communication functionality. In various non-limiting embodiments, user device 202 may comprise any of a portable computer, tablet computer, phablet, cellular phone, smartphone, personal digital assistant, a wearable device such as a smartwatch, smart glasses, smart lenses, smart clothing or the like, or any other portable communication device configured to implement data processing functionality, network communication functionality and/or wireless communication functionality. In an embodiment, user device 202 may be configured according to the device configuration illustrated in FIG. 8. The configuration and functionality of user device 202 for the purposes of implementing the present invention is described in more detail hereinbelow. In various embodiments, user device 202 is configured to implement method steps from one or more of FIGS. 3 to 6B.

Identity verification system 204 comprises any processor based electronic data processing system that is configured to implement data processing functionality, and/or network communication functionality. In an embodiment, identity verification system 204 comprises at least one processor implemented server or data processing device. In another embodiment, identity verification system 204 comprises a plurality of processor implemented servers or a plurality of data processing devices operating in a network configuration or in a distributed computing configuration for implementing the functionality described in more detail hereinbelow. In an embodiment, identity verification system 204 may be configured according to the device configuration illustrated in FIG. 9. The configuration and functionality of identity verification system 204 for the purposes of implementing the present invention is described in more detail hereinbelow.

As used herein, identity verification system 204 refers to any system, component, device, or service that is configured to determine or validate that a claimed identity or presence requirement is satisfied. Such determination may be based on direct verification of identity data (for example, comparing attributes or biometrics against records), or on validation of a cryptographically verifiable proof, attestation, assertion, or selectively disclosed attribute received from a user device. In certain embodiments, identity verification system 204 operates not by validating raw credential data or performing biometric matching itself, but by verifying a cryptographically signed proof or assertion generated by user device 202, the proof or assertion being based on, derived from, or contingent upon successful verification of authenticity of a set of credential data and a positive result from matching live biometric sample data of the individual with reference biometric data contained within the trusted credential data object, or upon a result of one or more computations or data operations involving any of the set of credential data or the digital signature associated with the trusted credential, performed locally at user device 202. In this delegated-trust or digital-notary model, identity verification system 204 relies on cryptographic assurances to establish the individual's verified identity and live presence without access to the underlying credential or biometric data. In other embodiments, the identity verification system may be wholly or partially implemented on a user device 202, or integrated with a gated system 206. In an embodiment, authenticity of credential data using a digital signature associated with the trusted credential may be verified by any of the user device 202, the identity verification system 204, or an associated authorization system.

Identity verification system 204 is configured to receive from user device 202, data associated with an individual, for ascertaining the identity of the individual. Identity verification system 204 is configured to participate in an identity verification process based on the received data—wherein the received data is obtained from or derived from information transmitted by the user device following a local verification of the individual's identity and live presence representing whether the individual corresponding to the identity data in the trusted credential data object is present at, or is in possession or control of, user device 202. In a preferred embodiment, the received data does not include any personal attribute or biometric information, but rather comprises a cryptographically verifiable proof or assertion generated by the user device after validating a trusted credential data object and confirming live presence of the individual associated with the trusted credential. In some embodiments, the proof or attested result may represent only a minimal or derived outcome, for example, a binary indication that an age or eligibility condition ("Are you over 21 years old?") is satisfied, or that a claimed identity ("Are you John Smith?") has been confirmed. In other cases, even the existence or timing of a valid transmission from the user device may itself constitute sufficient proof, where the transmission is generated only upon a verified match or other computation based on, derived from, or contingent upon any attribute or biometric data within the trusted credential or its digital signature. Such information enables the identity verification system to determine, directly or indirectly, whether the individual operating or present at the user device is the rightful bearer of the trusted credential, and whether one or more verification outcomes or access-control conditions are satisfied.

In certain embodiments, the results or outputs from the identity verification process implemented at identity verification system 204 may be transmitted to gated system 206. In various embodiments, identity verification system 204 is configured to implement method steps from one or more of FIGS. 3, 4 and 7. In other embodiments, the results or outputs from the identity verification process implemented at identity verification system 204 may be obtained at the user device 202—which may in turn transmit a message or signal to gated system 206, wherein the contents of said message or signal are based on, derived from, or reliant upon the results or outputs received from the identity verification process involving the identity verification system 204.

Gated system 206 may be configured to restrict or control access to a product or service, location, resource, or digital workflow. In some embodiments, gated system 206 may be configured to receive from identity verification system 204, a message or signal that communicates a result of an identity verification process implemented at identity verification system 204 in respect of an individual seeking access to or access permissions from gated system 206. In other embodiments, gated system 206 may be configured to receive from user device 202, a message or signal that is based or reliant on the results or outputs received from the identity verification process involving the identity verification system 204, in respect of an individual seeking access to or access permissions from gated system 206.

Gated system 206 may grant or deny the requested access or permissions based on the result(s) (of the identity verification process) that has been received from identity verification system 204 and/or based on the message or signal received from user device 202. For example, gated system 206 may be configured to (i) grant the requested access or permission if the result (of the identity verification process) or the message/signal received from user device 202 establishes that the individual seeking access or permission is authorized to access or to receive access permission from gated system 206, or (ii) deny the requested access or permission if the received result (of the identity verification process) or the message/signal received from user device 202 establishes that the individual seeking access or permission is not authorized to access or to receive access permission from gated system 206.

In various non-limiting embodiments, gated system 206 comprises any of a portable computer, tablet computer, phablet, cellular phone, smartphone, personal digital assistant, a point-of-sale terminal, a point-of-sale kiosk, a cash register, a vending machine or vending cabinet, an electronic door lock, a checkpoint device, a security barrier, or a gate control device that controls or selectively permits access of authorized individuals into a restricted access area (e.g. into a venue for a sporting event, a flight, a vehicle rental, a lodging rental, a concert, a performance, a movie, public transport, and so on), or the like. As used herein, gated system 206 refers to any system, device, component, or workflow that restricts or conditions execution of an action, access to a resource, or initiation of a transaction on verified identity and/or live presence of an individual. In various embodiments, gated system 206 may comprise a physical device (e.g., point-of-sale terminal, access gate, vending cabinet, electronic lock, checkpoint device, or security barrier), a digital service (e.g., an online account, application, or platform accessible over a network), or a digital workflow in which gating corresponds to non-access actions, such as: (i) approving or authorizing a transaction; (ii) providing a notarized or cryptographically attested signature on a document, records, or digital artefact; (iii) joining or authenticating into a meeting, session, or collaboration platform; (iv) redirecting a client interface to a specific resource, application state, or transaction flow; (v) approving, publishing, or moderating a post, comment, or submission; or (vi) any other action where execution is gated or based on verified identity and live presence of an individual. In some embodiments, identity verification system 204 and gated system 206 are implemented as distinct entities, while in other embodiments they may be combined into a single system or device that both verifies identity and controls access or workflow.

Trusted credential system 208 comprises any processor based electronic data processing system that is configured to implement data processing functionality, and/or network communication functionality. In an embodiment, trusted credential system 208 comprises at least one processor implemented hardware security module, or a processor implemented server, or a data processing device. In another embodiment, trusted credential system 208 comprises a plurality of processor implemented servers or a plurality of data processing devices operating in a network configuration or in a distributed computing configuration for implementing the functionality described in more detail hereinbelow.

Trusted credential system 208 is a system that is controlled or operated by a trusted entity, and which maintains a set of trusted credential records—each trusted credential record (i) comprising a data record or set of data records corresponding uniquely to one individual registered with or enrolled within the trusted credential system, and (ii) comprising identity data associated with that individual.

In various embodiments, the trusted entity that controls or operates trusted credential system 208 is any one of a government entity or organization, such as passport issuing authorities, driver license issuing authorities, national or regional identity proof issuing authorities, any government backed ID issuing authority, or any private party that is trusted to maintain secure and accurate data records that store identity data associated with individuals. In more particular embodiments, the trusted entity comprises any of a governmental entity, a national identity provider, a state agency, a financial institution, an educational institution, a healthcare provider, a private enterprise, or an identity provider.

Trusted credential system 208 is configured to maintain trusted credential records corresponding to individuals that are registered with or enrolled within the trusted credential system.

Trusted credential system 208 is additionally configured to generate a trusted credential based on data stored within a trusted credential record. A trusted credential generated by trusted credential system 208 includes (or has associated therewith) a trusted credential data object 210 that encapsulates or includes a defined set of data fields that represent identity of an individual to which the trusted credential (and the trusted credential data object 210) corresponds, metadata, and/or one or more digital signatures that enables validation (i) of the trusted credential data object 210 itself and/or (ii) that the trusted credential data object 210 has been generated by the trusted credential system. Non-limiting examples of trusted credentials of a kind that trusted credential system 208 may be configured to generate are ePassports, mobile driver licenses (mDLs), a national identity card, a government-issued employee or contractor credential, a photo identification credential, a verifiable credential, a decentralized identifier (DID), or a QR-code-based identity credential.

In an embodiment, each trusted credential data object 210 generated by trusted credential system 208 includes biometric data associated with the individual to which the trusted credential data object 210 (and the corresponding trusted credential) corresponds. The biometric data within a trusted credential data object 210 comprises (a) one or more biometric images or one or more digital representations of biometric feature(s) associated with the individual, and/or (b) a biometric template associated with the individual, that has been generated based on one or more biometric features of the individual, and/or (c) data that has been derived based on a biometric image, or based on a representation of a biometric feature, or based on a biometric template associated with the individual, that has been generated based on one or more biometric features of the individual. In various exemplary embodiments, the biometric image(s), or the digital representations of biometric feature(s), or the biometric template(s), is any one of a voice based, iris based, retina based, fingerprint based, palm-print based, palm vein based, periocular based, facial characteristic based, ear based, DNA (deoxyribonucleic acid) based, scleral vein based, finger geometry based, palm geometry based, gait based, heartbeat based, vascular based, signature based, or any other human body part or behaviour based biometric.

Additionally, each trusted credential data object 210 generated by trusted credential system 208 includes or is accompanied by a digital signature (or more than one digital signatures) generated by trusted credential system 208. The digital signature(s) is generated by cryptographically signing (i) any one or more instances of data within the trusted credential data object 210, or (ii) data derived from one or more instances of data within the trusted credential data object 210 (for example, one or more hash values generated based on instances of data within trusted credential data object 210). The digital signature enables integrity and authenticity verification of trusted credential data object 210 through cryptographic authentication mechanisms that would be apparent to the skilled person.

Implementation of the present invention within system environment 200 of FIG. 2 is discussed in more detail below in connection with FIGS. 3 to 7.

FIG. 3 is a flowchart illustrating a method of implementing identity verification and conditional state change in a device or system, in accordance with the present invention. The method steps of FIG. 3 are implemented partially or wholly at or within identity verification system 204. In one embodiment, some method steps of FIG. 3 are implemented at or within user device 202. In an embodiment of the invention, identity verification system 204 is distinct from, logically isolated from, and/or located remotely from user device 202.

Step 302 comprises obtaining a set of information—wherein the set of information comprises, or is derived from, a set of transmission data that has been transmitted from user device 202 subsequent to performance of a set of user identity verification steps at user device 202. The set of user identity verification steps that are performed at user device 202 prior to transmission of the set of transmission data from user device 202, are described in detail in connection with FIGS. 5 and 6.

The set of information, which is based on transmission data received from user device 202, includes, or is derived from, or is generated based on:

- data within a trusted credential data object 210 uniquely associated with an individual—wherein said trusted credential data object 210 has been generated by trusted credential system 208 and wherein said trusted credential includes biometric data associated with that individual, or
- a digital signature that has been provided by trusted credential system 208, and which has been generated by cryptographically signing any of (i) biometric data within trusted credential data object 210, or a subset of such biometric data, or data derived from the biometric data or from a subset thereof (for example, hash data derived from the biometric data or subset thereof), and/or (ii) any other data (i.e. non-biometric data) within trusted credential data object 210 that represents attributes or other information associated with said individual ("attribute data"), or a subset of such attribute data, or data derived from such attribute data or from a subset thereof (for example, hash data derived from the attribute data or subset thereof), or
- a result of one or more data operations involving any of data within the trusted credential data object 210 or data within the digital signature.

In specific embodiments of the above, the digital signature has been generated by cryptographically signing data included in a trusted credential data object 210 corresponding to any of an electronic passport (ePassport), a mobile driver's license (mDL), a national identity card, a government-issued employee or contractor credential, a photo identification credential, a verifiable credential, a decentralized identifier (DID), or a QR-code-based identity credential.

Step 304 comprises initiating a state change in a device or system, wherein (i) the state change, or a changed state arising from the state change, is conditioned upon, a determination that a set of state change requirements are met, and (ii) the determination that a set of state change requirements are met, relies on data within the set of information obtained at step 302. The steps or processes involved in initiating a state change at step 304 are described in more detail in connection with FIG. 7. In an embodiment, the device or system in which the state change is initiated is gated system 206. In another embodiment, the device or system in which the state change is initiated is distinct from, logically isolated from, and/or located remotely from identity verification system 204. In an embodiment, the initiated state change results in any of (i) permitting, providing or denying access to, or locking or unlocking a system, device, location, premise, product or service, or (ii) initiating or terminating delivery or access to data, a service, or a digital workflow.

Figure 4:
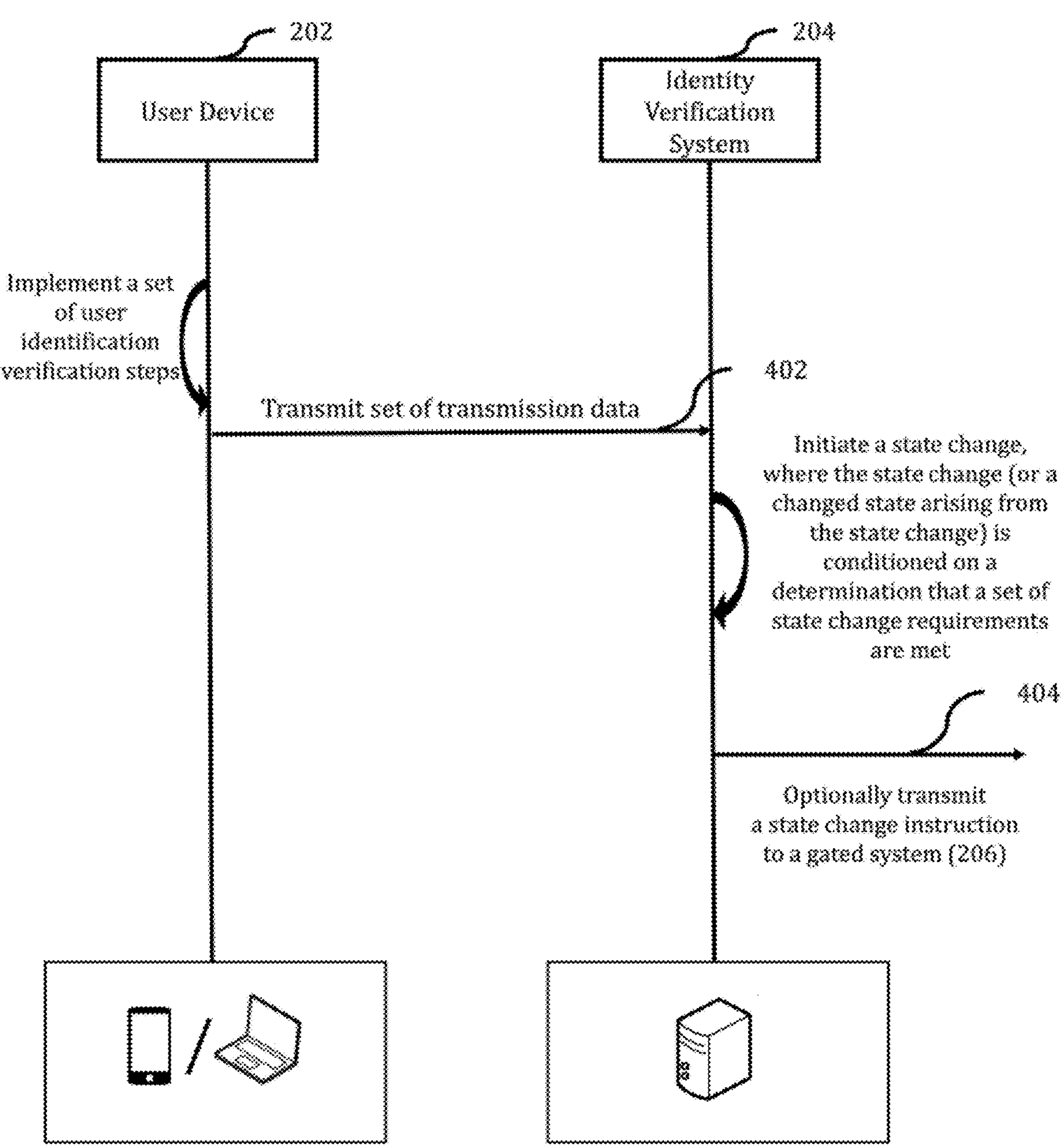
FIG. 4 is a communication flow diagram illustrating communication flow between entities for performing the method of FIG. 3.

FIG. 4 is a communication flow diagram illustrating communication flow between entities for performing the method of FIG. 3.

As shown in FIG. 4, user device 202 implements a set of user identification verification steps (which are described in detail below in connection with FIG. 5). Subsequently at step 402, user device 202 transmits a set of transmission data to identity verification system 204.

Identity verification system 204 receives the set of transmission data and initiates a state change in a device or system, wherein (i) the state change, or a changed state arising from the state change, is conditioned upon, a determination that a set of state change requirements are met, and (ii) the determination that a set of state change requirements are met, relies on data within a set of information—wherein the set of information comprises, or is derived from, the set of transmission data. The steps or processes involved in initiating a state change at step 304 are described in more detail in connection with FIG. 7.

Step 404 is an optional step where identity verification system 204 transmits a state change instruction to gated system 206, for implementing the initiated state change at, within, or through the gated system 206.

FIG. 5 is a flowchart illustrating a method of implementing method step 302 in the flowchart of FIG. 3. In an embodiment, the method steps of FIG. 5 are implemented at user device 202.

Step 502 comprises obtaining at user device 202, a set of credential data associated with an individual, wherein the set of credential data comprises at least biometric data associated with the individual. In an embodiment, the set of credential data comprises a trusted credential data object 210 generated by trusted credential system 208. In an embodiment, the set of credential data comprises both biometric data and attribute data associated with the individual.

The biometric data within the set of credential data comprises (a) one or more biometric images or one or more digital representations of biometric feature(s) associated with the individual, and/or (b) a biometric template associated with the individual, that has been generated based on one or more biometric features of the individual, and/or (c) data that has been derived based on a biometric image, or based on a representation of a biometric feature, or based on a biometric template associated with the individual, that has been generated based on one or more biometric features of the individual. In various exemplary embodiments, the biometric image(s), or the digital representations of biometric feature(s), or the biometric template(s), is any one of a voice based, iris based, retina based, fingerprint based, palm-print based, palm vein based, periocular based, facial characteristic based, car based, DNA (deoxyribonucleic acid) based, scleral vein based, finger geometry based, palm geometry based, gait based, heartbeat based, vascular based, signature based, or any other human body part or behaviour based biometric.

The attribute data within the set of credential data may include any other data (i.e. non-biometric data) within the set of credential data, that represents one or more attributes or other information associated with said individual. Exemplary, non-limiting instances of attribute data associated with an individual include the individual's name, date of birth, address, sex, nationality, or credential number, issue date, and/or expiry date associated with trusted credential data object 210 (or with a corresponding trusted credential), or issuing jurisdiction, class of credential, or restrictions related to the trusted credential data object 210 (or the corresponding trusted credential).

Step 504 comprises obtaining at the user device 202, a digital signature issued by trusted credential system 208. The digital signature that is obtained at step 504 has been generated by cryptographically signing any of (i) biometric data within the set of credential data (that has been obtained at step 502), or a subset thereof or data derived therefrom, and (ii) attribute data within the set of credential data, wherein the attribute data represents one or more attributes associated with the individual, or a subset of said attribute data, or data derived therefrom. In an embodiment, the cryptographic signing for the purposes of generating the digital signature is performed using a private key of an asymmetric cryptographic key pair associated with trusted credential system 208.

It will be understood that either or both of the set of credential data that is obtained at user device 202 (at step 502) and the digital signature that is obtained at user device 202 (at step 504) may (i) be obtained in real time by network communication between user device 202 and trusted credential system 208, or (ii) have been previously obtained or stored at, or provisioned on, user device 202 (for example during installation on user device 202 of a software application, such as any of a digital wallet software application, a digital locker software application, or an identity verification software application), for the purpose of configuring user device 202 to implement one or more of the methods of FIG. 3, 4 or 5, or (iii) may be obtained, extracted, read or retrieved from a physical or electronic credential or record, or from a trusted credential data object 210 that has been generated by trusted credential system 208.

Step 506 comprises obtaining at user device 202, live biometric sample data, wherein the live biometric sample data is obtained or derived from a biometric sample acquired from an individual operating or controlling or having access (at the time of acquisition of the live biometric sample data) to user device 202. In an embodiment, the live biometric sample data is acquired using at least one biometric sample acquisition sensor(s) that is operated by or controlled by or communicably coupled with user device 202. In a further embodiment, the live biometric sample data obtained at step 506, and the biometric data within the set of credential data (obtained at step 502) both correspond to a same biometric-type, wherein the biometric-type is any one of a voice based, iris based, retina based, fingerprint based, palm-print based, palm vein based, periocular based, facial characteristic based, car based, DNA (deoxyribonucleic acid) based, scleral vein based, finger geometry based, palm geometry based, gait based, heartbeat based, vascular based, signature based, or any other human body part or behaviour based biometric.

Step 508 comprises comparing, the live biometric sample data with reference biometric data, wherein the reference biometric data comprises any of (i) biometric data within the set of credential data obtained at step 502, or (ii) biometric data that is verifiably linked with or derived from the biometric data within the set of credential data obtained at step 502. The comparison at step 508 may be performed at user device 202, or may be performed at another device or system to which user device transmits or delegates a request for performing the comparison at step 508. In implementations where the comparison at step 508 is performed at a device or system other than user device 202 (i) the live biometric sample data, and at least one of the biometric data within the set of credential data or the reference biometric data, is transmitted to said device or system for performing the comparison, and (ii) data representing (or generated based on) a result of the comparison is transmitted from said system or device back to user device 202.

The comparison at step 508 may result in either (i) a positive "match" result indicating that the live biometric sample data and the reference biometric data are sufficiently similar or satisfy a predefined threshold of similarity, or (ii) a negative "non-match" result indicating that the live biometric sample data and the reference biometric data are insufficiently similar or sufficiently dissimilar or do not satisfy a predefined threshold of similarity. In an embodiment, while the user device obtains both the live biometric sample data and the reference biometric data, the computation of the comparison may be delegated to another component or system operating in communication with, under control of, or within a trust boundary of, the user device.

As used herein, "verifiably linked" refers to an association between two biometric data sets that can be confirmed to correspond to a common individual by reference to temporal, contextual, or continuity-based factors, or through any other suitable means of establishing a verifiable correspondence therebetween. Such verification is based on objective and reproducible evidence, and excludes correspondence inferred from coincidence, assumption, or unverified correlation.

In an exemplary embodiment, the reference biometric data positively matches a first biometric sample acquired using a first camera, and the biometric data within the set of credential data positively matches a second biometric sample acquired using a second camera, wherein (i) the first and second biometric samples are acquired simultaneously or in rapid succession, and (ii) the first and second cameras have overlapping fields of view, thereby establishing a verifiable linkage to a common individual that is not based on coincidence, inference, or assumption of identity, but on measurable temporal and spatial continuity between the samples.

Step 510 comprises transmitting a set of transmission data from user device 202 to identity verification system 204, subsequent to a positive biometric match result at step 508, wherein the set of transmission data (i) includes, is derived from, or has been generated based on, data within any of the set of credential data (that has been obtained at step 502) or the digital signature (that has been obtained at step 504), or (ii) has been generated based on a result of one or more data operations involving any of the set of credential data or the digital signature. In an embodiment the set of transmission data includes the set of credential data obtained at step 502 (or any subset or derivative thereof) and additionally includes (either as part of the set of credential data, or in addition thereto) the digital signature. In another embodiment the set of transmission data does not include credential data, digital signature, or both.

In an embodiment, a biometric non-match decision would result in user device 202 not transmitting the set of transmission data to identity verification system 204.

In another more specific embodiment, the set of transmission data is transmitted at step 510 from user device 202 to identity verification system 204 in response to both (i) a positive biometric match result at step 508, and (ii) successful verification of authenticity of any data from the set of credential data, wherein the verification of authenticity of said data is performed using the digital signature. In an embodiment, the verification is performed by cryptographically verifying the digital signature (that has been received at step 504) using a public key of an asymmetric cryptographic key pair associated with trusted credential system 208, and thereafter comparing data from within the set of credential data (or a subset or derivative thereof) against data that has been authenticated by cryptographically verifying the digital signature (or a subset or derivative thereof). A match decision arising from this comparison results in successful verification of authenticity of data within the set of credential data.

In an embodiment of the method of FIG. 5, the set of transmission data is end-use restricted to one or more specific contexts by cryptographically binding the set of transmission data to one or more context-specific inputs. The context-specific inputs may comprise any of a computing system identifier, a challenge value, a nonce, a session identifier, a timestamp, a device identifier, a geographic location, or a network address.

In a specific embodiment of the method of FIG. 5, the set of transmission data comprises, or is generated using, one or more of (i) an identity attribute, attribute-level assertion, or pseudonymous identifier, including a pseudonymous identifier that supports identity continuity across multiple interactions, (ii) data representing a scope of access, permission, or eligibility associated with the individual or the user device, said data comprising any of an access token, authentication token, authorization code, a cryptographic key, account identifier, passkey, or payment credential, or credentials or one or more keys previously stored on the user device and released conditionally based on user intent or policy, (iii) a cryptographically verifiable proof, comprising a zero-knowledge proof of possession or control of a credential, attribute, or identity assertion, wherein said cryptographically verifiable proof omits or masks the credential, attribute, or identity, (iv) a biometrically-derived identifier or other user-associated data accessible to the user device, (v) a selectively disclosed subset of the credential data initially obtained at user device 202, wherein selective disclosure of said subset of the credential data is performed based on a request, policy, or user preference, and (vi) a verifiable assertion, token, or credential formatted for compatibility with one or more standard authentication, authorization, or identity verification protocols.

Figure 6A:
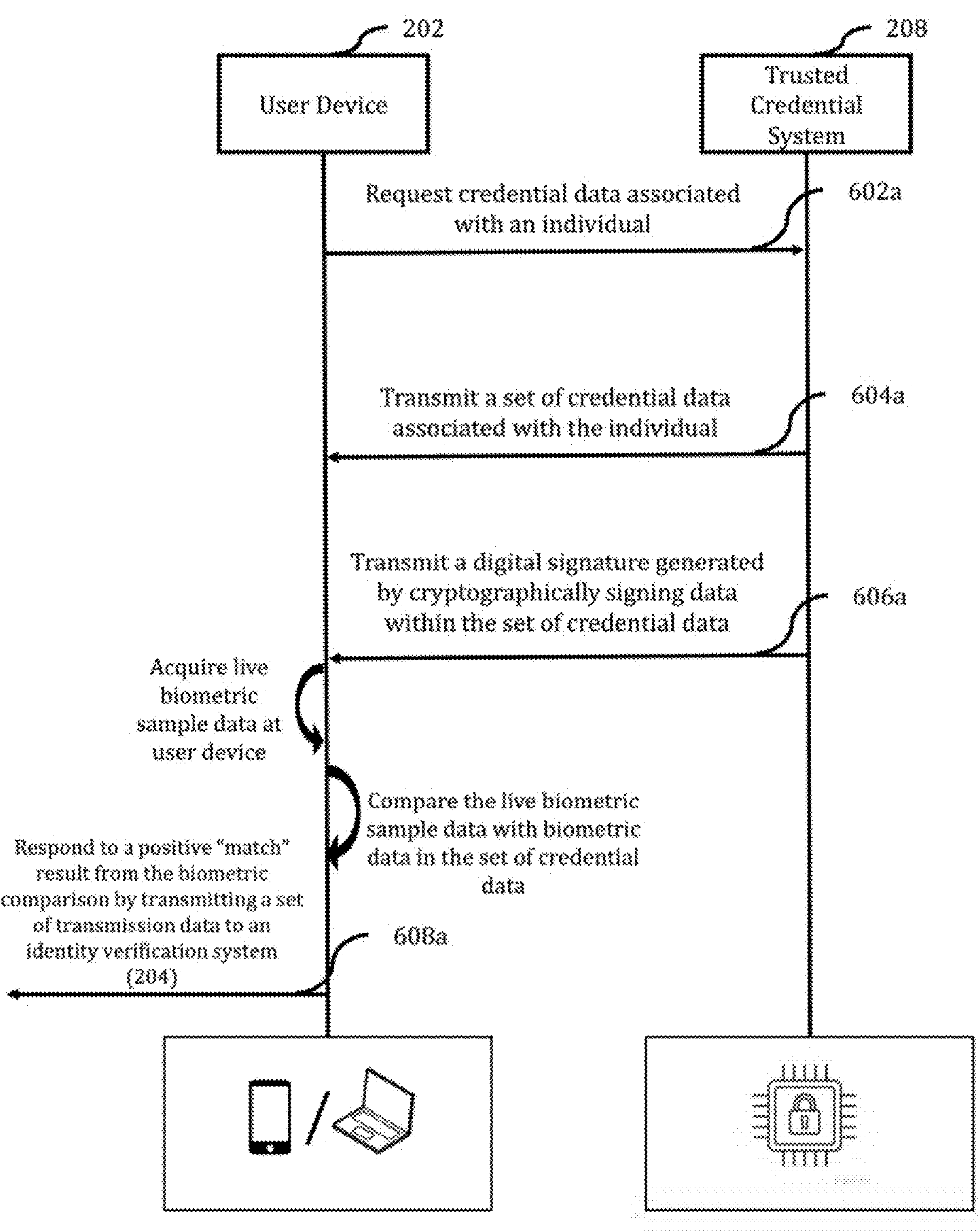
FIG. 6A is a communication flow diagram illustrating communication flow between entities for performing a first embodiment of the method of FIG. 5.

FIG. 6A is a communication flow diagram illustrating communication flow between entities for performing a first embodiment of the method of FIG. 5. It will be understood that the communication flow illustrated in FIG. 6A is observed in embodiments where either or both of the set of credential data that is obtained at user device 202 (at step 502) and the digital signature that is obtained at user device 202 (at step 504) are obtained at user device 202 through network communication between user device 202 and trusted credential system 208. This communication flow would not be observed in embodiments where (a) the set of credential data that is obtained at user device 202 (at step 502) and the digital signature that is obtained at user device 202 (at step 504) have both been previously stored on, or provisioned on user device 202 (for example in the form of trusted credential data object 210) on user device 202 other than by said network communication, or (b) the set of credential data and the digital signature are both obtained at user device 202 by accessing trusted credential data object 210 at a location other than within trusted credential system 208. It would be understood that in either of these alternates to the method embodiment illustrated in FIG. 6A, both of the set of credential data and the digital signature are accessed by or made available to user device 202, by methods other than said network communication/messaging.

As shown in FIG. 6A, at step 602*a*, user device 202 requests credential data associated with a specific individual from trusted credential system 208.

At step 604*a*, trusted credential system 208 responds to the request by transmitting to user device 202, a set of credential data associated with the specific individual. As explained in connection with step 502, the set of credential data comprises at least biometric data associated with the individual. In some embodiments, the set of credential data comprises both biometric data and attribute data associated with the individual (wherein the attribute data represents one or more attributes associated with the individual). In an embodiment, the set of credential data comprises a trusted credential data object (for example trusted credential data object 210) generated by trusted credential system 208.

At step 606*a*, trusted credential system 208 additionally transmits to user device 202, a digital signature. In an embodiment, the digital signature that is transmitted at step 606*a* has been generated by cryptographically signing any of (i) biometric data within the set of credential data (that has been transmitted at step 604*a*), or a subset thereof or data derived therefrom, and (ii) attribute data within the set of credential data.

It will be understood that steps 604*a* and 606*a* can be performed in any chronological order, or simultaneously.

Subsequent to steps 604*a* and 606*a*, user device 202 obtains live biometric sample data, wherein the live biometric sample data is obtained or derived from a biometric sample acquired from an individual operating or controlling or having access (at the time of acquisition of the live biometric sample data) to user device 202. User device 202 thereafter compares the live biometric sample data with reference biometric data, wherein the reference biometric data comprises any of (i) biometric data within the set of credential data obtained at step 604*a*, or (ii) biometric data that is verifiably linked with or derived from the biometric data within the set of credential data obtained at step 604*a*.

At step 608*a*, user device responds to a positive "match" result from the biometric comparison, by transmitting a set of transmission data to an identity verification system 204 (not shown in FIG. 6A), wherein the set of transmission data (i) includes, is derived from, or has been generated based on, data within any of the set of credential data (that has been obtained at step 604*a*) or the digital signature (that has been obtained at step 606*a*), or (ii) has been generated based on a result of one or more data operations involving any of the set of credential data or the digital signature.

Figure 6B:
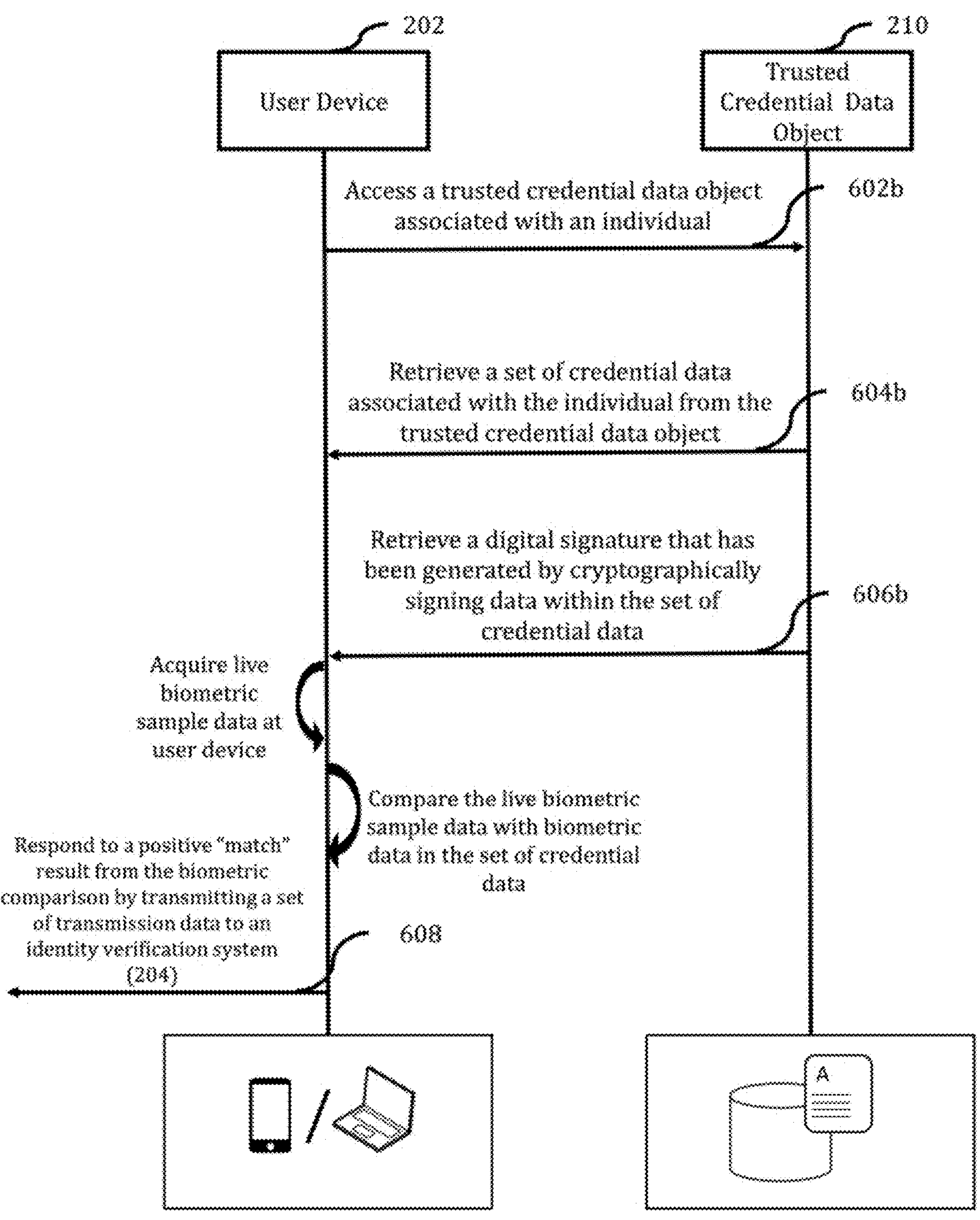
FIG. 6B is a communication flow diagram illustrating communication flow between entities for performing a second embodiment of the method of FIG. 5.

FIG. 6B is a communication flow diagram illustrating communication flow between entities for performing a second embodiment of the method of FIG. 5. It will be understood that the communication flow illustrated in FIG. 6B is observed in embodiments where the set of credential data that is obtained at user device 202 (at step 502) and the digital signature that is obtained at user device 202 (at step 504) (a) have both been previously stored at or provisioned (for example in the form of trusted credential data object 210) on user device 202, or (b) are both been obtained at user device 202 by accessing trusted credential data object 210 from a location or storage outside of trusted credential system 208.

As shown in FIG. 6B, at step 602*b*, user device 202 accesses a trusted credential data object 210 (that has been generated by trusted credential system 208) that is associated with a specific individual. In one embodiment, the trusted credential data object 210 has been previously stored at or provisioned within a memory of user device 202. In another embodiment, trusted credential data object 210 has been accessed from a location or storage outside of trusted credential system 208—for example from a memory within an ePassport chip, or from a memory within an mDL wallet application, or from a memory within any other smart card or identity card, or from a QR code printed on any identity card or identity document or any other document.

At step 604*b*, user device 202 retrieves a set of credential data associated with the individual, from the trusted credential data object 210 that has been accessed at step 602*b*.

As explained in connection with step 502, the set of credential data comprises at least biometric data associated with the individual. In some embodiments, the set of credential data comprises both biometric data and attribute data associated with the individual (wherein the attribute data represents one or more attributes associated with the individual). In an embodiment, the set of credential data comprises the trusted credential data object 210.

At step 606*b*, user device 202 additionally retrieves from the trusted credential data object 210, a digital signature. In an embodiment, the digital signature that is retrieved at step 606*b* has been generated by cryptographically signing any of (i) biometric data within the set of credential data (that has been retrieved at step 604*b*), or a subset thereof or data derived therefrom, and (ii) attribute data within the set of credential data.

It will be understood that steps 604*b* and 606*b* can be performed in any chronological order, or simultaneously.

Subsequent to steps 604*b* and 606*b*, user device 202 obtains live biometric sample data, wherein the live biometric sample data is obtained or derived from a biometric sample acquired from an individual operating or controlling or having access (at the time of acquisition of the live biometric sample data) to user device 202. User device 202 thereafter compares the live biometric sample data with reference biometric data, wherein the reference biometric data comprises any of (i) biometric data within the set of credential data obtained at step 604*b*, or (ii) biometric data that is verifiably linked with or derived from the biometric data within the set of credential data obtained at step 604*b*.

At step 608*b*, user device responds to a positive "match" result from the biometric comparison, by transmitting a set of transmission data to an identity verification system 204 (not shown in FIG. 6B), wherein the set of transmission data (i) includes, is derived from, or has been generated based on, data within any of the set of credential data (that has been obtained at step 604*b*) or the digital signature (that has been obtained at step 606*b*), or (ii) has been generated based on a result of one or more data operations involving any of the set of credential data or the digital signature. In certain implementations, the act of comparing may be performed within a secure component or system to which the user device delegates computation, provided such component operates under the authority of, or within a trust boundary established by, the user device.

FIG. 7 is a flowchart illustrating a method of implementing method step 304 (as described in connection with FIG. 3). In an embodiment, the method steps of FIG. 7 are implemented either wholly at identity verification system 204 or partly at user device 202 and partly at identity verification system 204. In one embodiment, the method steps of FIG. 7 are implemented at identity verification system 204. In another embodiment, the method steps of FIG. 7 are implemented within user device 202. In yet another embodiment, the method steps of FIG. 7 are implemented at an identity verification system 204 that is embedded within user device 202.

Step 702 comprises determining whether the set of information obtained from the user device at step 302 of FIG. 3, satisfies one or more predefined credential data requirements associated with the state change. In a preferred embodiment, the predefined credential data requirements comprise successful verification of a cryptographically signed proof, said proof being contingent upon validation of a trusted credential and a live biometric match at the user device.

Step 704 comprises cryptographically verifying authenticity of any data within the set of credential data, wherein said verification is performed using the (i) digital signature generated by trusted credential system 208, and (ii) data other than the digital signature within the obtained set of information (obtained at step 302 of FIG. 3) from user device 202. The verification may be performed at the user device, at the identity verification system, or at any other trusted component within the verification process.

As discussed above (in connection with step 504), the digital signature has been generated by cryptographically signing any of (i) biometric data within the set of credential data obtained from trusted credential system 208 (at step 502), or a subset thereof or data derived therefrom, and (ii) attribute data within said set of credential data. In an embodiment, the cryptographic signing for the purposes of generating the digital signature has been performed using a private key of an asymmetric cryptographic key pair associated with trusted credential system 208.

Accordingly, the verification of authenticity at step 704 may be performed in any sequence or location of the system components, provided that authenticity is established before the state change is executed, by cryptographically verifying the digital signature (that has been received by user device 202 at step 504) using a public key of the asymmetric cryptographic key pair associated with trusted credential system 208, and thereafter comparing data from within the obtained set of information (obtained at step 302 of FIG. 3) from user device 202 (or a subset or derivative thereof) against data that has been generated by cryptographically verifying the digital signature (or a subset or derivative thereof). A match decision arising from this comparison results in successful verification of authenticity of data within the set of information obtained (at step 302 of FIG. 3) from user device 202.

It would be understood that steps 702 and 704 need not be performed in the order shown in FIG. 7 (where step 702 is shown as being performed prior to step 704). Instead these two steps can be performed in any order, or simultaneously, and can also be performed at any location-provided both steps have been performed prior to execution of step 706.

Step 706 comprises initiating a state change in a device or a system (for example in gated system 206), wherein the state change (or a changed state arising from the state change) is conditioned upon (i) a determination (at step 702) that the set of information received from the user device satisfies one or more predefined credential data requirements associated with the state change, and (ii) a positive result (at step 704) from verification of authenticity of any data from the set of credential data—wherein the verification has been performed using the digital signature (verified at any trusted component of the system) that has been received by user device 202 at step 504. In an embodiment, step 706 is performed by identity verification system 204. In another embodiment, step 706 is performed at user device 202.

In an embodiment, the initiated state change results in any of (i) permitting, providing or denying access to, or locking or unlocking a system, device, location, premise, product or service, or (ii) initiating or terminating delivery or access to data, a service, or a digital workflow.

In a more particular embodiment of the method of FIG. 7, the user device 202 generates a second digital signature by cryptographically signing (for example, with a private key of an asymmetric key pair associated with user device 202) a second set of data, and said second digital signature is transmitted to identity verification system 204, along with, or as part of, or in addition to transmission of the set of transmission data at step 302 of FIG. 3. Identity verification system 204 uses a public key of the asymmetric key pair associated with user device 202 to verify the second digital signature, and to compare the hash value corresponding to the digital signature with the hash value computed from a set of reference data accessible at the identity verification system. The set of reference data or parts thereof may be contained within, or derived from the transmission data or may be accessible at the identity verification system 204 irrespective of the transmission data, for example as a part of a stored identity record.

In a particular embodiment of the method of FIG. 7, the second set of data comprises a part or the whole of data within the trusted credential received from trusted credential server 208, or a part or the whole of data within the digital signature received from trusted credential server 208, or both.

In another particular embodiment of the method of FIG. 7, the second digital signature is generated using a cryptographic key that has been associated with user device 202, or with a software application implemented or that has been or is being executed on user device 202. Said association is generated by an attestation service. In this embodiment, the state change at step 706 of FIG. 7, or the changed state arising from said state change, is additionally conditioned upon verification of authenticity of this cryptographic key using attestation data that has been associated with the user device or the software application.

In an even more particular implementation of this embodiment of the method of FIG. 7, initiation of the state change at step 706 is additionally conditioned upon, or the changed state arising from the state change is further based on, (i) successful execution of a cryptographic operation using a cryptographic key associated by the attestation service with the user device 202 or with the software application that is implemented or executed on user device 202, and (ii) verification of authenticity of said cryptographic key using attestation data associated with user device 202 or with the software application that is implemented or executed on user device 202.

In an embodiment of the method of FIG. 7, initiating a state change at step 706 comprises performing one or more of (i) causing a client interface associated with the individual to navigate to, or activate, one or more resources, services, transactions, application states, or interactions, (ii) processing a payment or transaction, permitting access to gated content, services, or systems, (iii) recording a notarized, signed, or otherwise verified digital action, and (iv) linking or activating an account, credential, or verified identity state, including during account creation or upon receipt of the information. In this embodiment, the state change may be initiated in response to an input, trigger, or contextual condition, the input, trigger, or contextual condition including, any of scanning a code, tapping a link, responding to a notification, or interacting with a physical interface, wherein the input, trigger or condition facilitates or requests use of the set of information.

In a specific embodiment of the method of FIG. 3, and/or the method of FIG. 7, user device 202 together with identity verification system 204 may perform secure multiparty computation implementing an oblivious pseudorandom function (OPRF) on the set of reference data accessible at the identity verification system 204 using a key that is inaccessible to identity verification system 204, producing the first OPRF value as the result of said computation. User device 202 computes a second OPRF value based on credential data corresponding to a trusted credential where the corresponding reference biometric data has resulted in a positive match with the live biometric sample, using the same key that was used for computing the first OPRF value. The state change requirements in step 304 may in this embodiment, include a determination that the first OPRF value is equal to the second OPRF value. In an embodiment, user device 202 may further limit the number or the rate of the OPRF computations in order to reduce the probability of obtaining trusted credential data of the live individual present at or operating the user device 202 by an entity other than the user device 202, for example by performing a dictionary attack using a set of known personal data from a large number of individuals.

In another embodiment, user device 202 and identity verification system 204 may perform secure multiparty computation of the private set intersection (PSI) between the set of reference data accessible by the identity verification system 204, and a set of the credential data from each of the trusted credentials/trusted credential data objects where the corresponding reference biometric data resulted in a positive match with the live biometric sample. In this embodiment, the state change requirements in step 304 may include a determination of non-empty set intersection. In this and the two embodiments described immediately hereinbelow, user device 202 may limit the number or the rate of the secure multiparty computations as well as the maximum number of elements in the first set of the credential data in order to reduce the probability of obtaining credential data of the live individual present at or operating the user device 202 by an entity other than the user device 202.

In yet another embodiment, secure multiparty computation may comprise computation of the asymmetric private set intersection (APSI), where the intersection is not revealed to identity verification system 204. In this embodiment, the state change requirements in step 304 include a determination of non-empty set intersection at the user device 202. In another embodiment, multiparty computation may comprise labeled asymmetric private set intersection, wherein the state change requirements in step 304 may be based on the data from the label of one or more elements in the set intersection. In some embodiments, the multiparty computation may involve the user device, the identity verification system, and/or one or more additional parties.

In another embodiment, the secure multiparty computation may comprise private set membership on the credential data corresponding to the credential where the corresponding reference biometric data resulted in a positive match with the live biometric sample. In this embodiment, the state change requirements in step 304 include a positive determination of the set membership.

Figure 8:
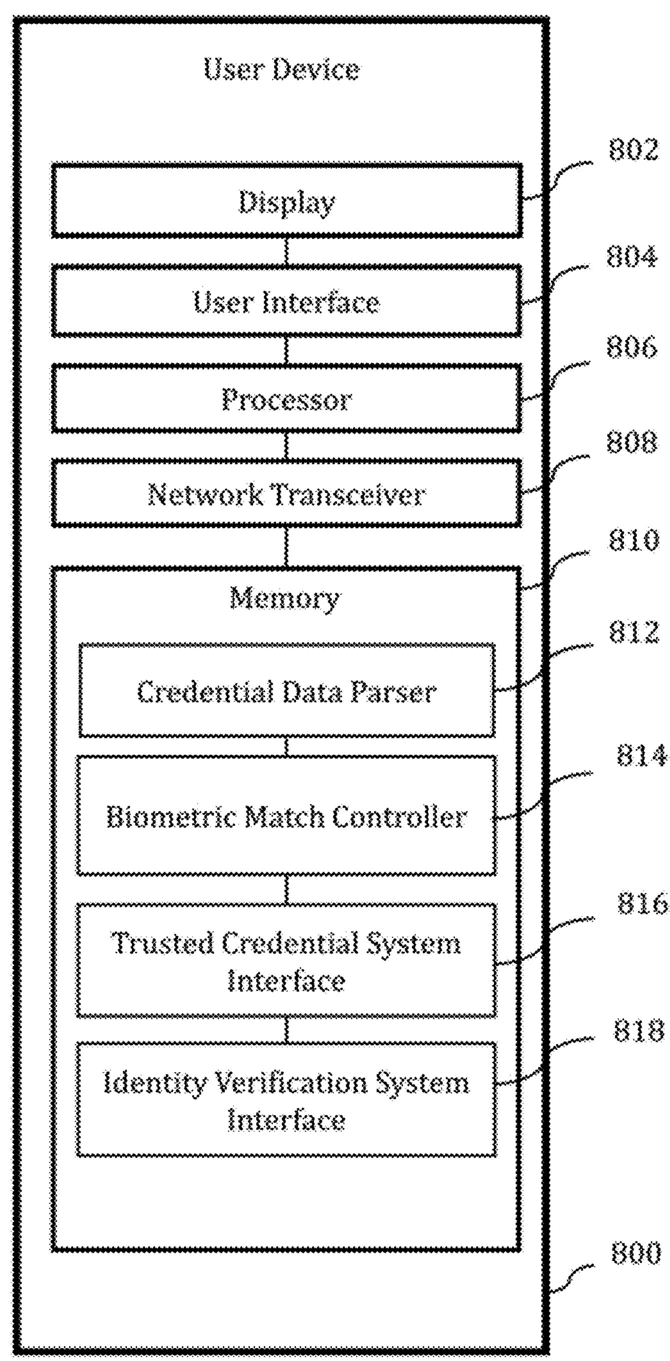
FIG. 8 illustrates an embodiment of a user device configured for implementing the teachings of the present invention.

FIG. 8 illustrates an embodiment of a user device 800 configured for implementing the teachings of the present invention.

User device 800 may comprise any processor implemented instance of any processor based electronic communication device or communication terminal that is configured to implement data processing functionality, network communication functionality and/or wireless communication functionality, and one or more of the method steps described above in connection with FIGS. 3 to 5 described above. User device 800 comprises a display 802, a user interface 804, processor 806, network transceiver 808 and memory 810, which memory 810 may include transitory memory and/or non-transitory memory. In an exemplary embodiment, memory 810 may have stored therewithin one or more of, (i) an operating system (not shown) configured for managing device hardware and software resources and that provides common services for software programs implemented within user device 800, (ii) a credential data parser 812 for parsing and/or extracting data from trusted credential data object(s) generated by trusted credential server 208, (iii) a biometric match controller configured for implementing one or both of steps 506 and 508 of the method of FIG. 5, (iv) a trusted credential system interface 816 which enables user device 800 to communicate with a trusted credential system 208 for the purposes of implementing one or more methods of the present invention (for example the methods of any of FIGS. 3 to 5), and (v) an identity verification system interface 818, which enables user device 800 to communicate with an identity verification system 204 for the purposes of implementing one or more methods of the present invention (for example the methods of any of FIGS. 3 to 5). Additionally, in certain embodiments, user device 800 may include a gated system interface (not shown in FIG. 8), which enables user device 800 to communicate with a gated system 206 for the purposes of implementing one or more methods of the present invention (for example the methods of any of FIGS. 3, 4 and 7).

Figure 9:
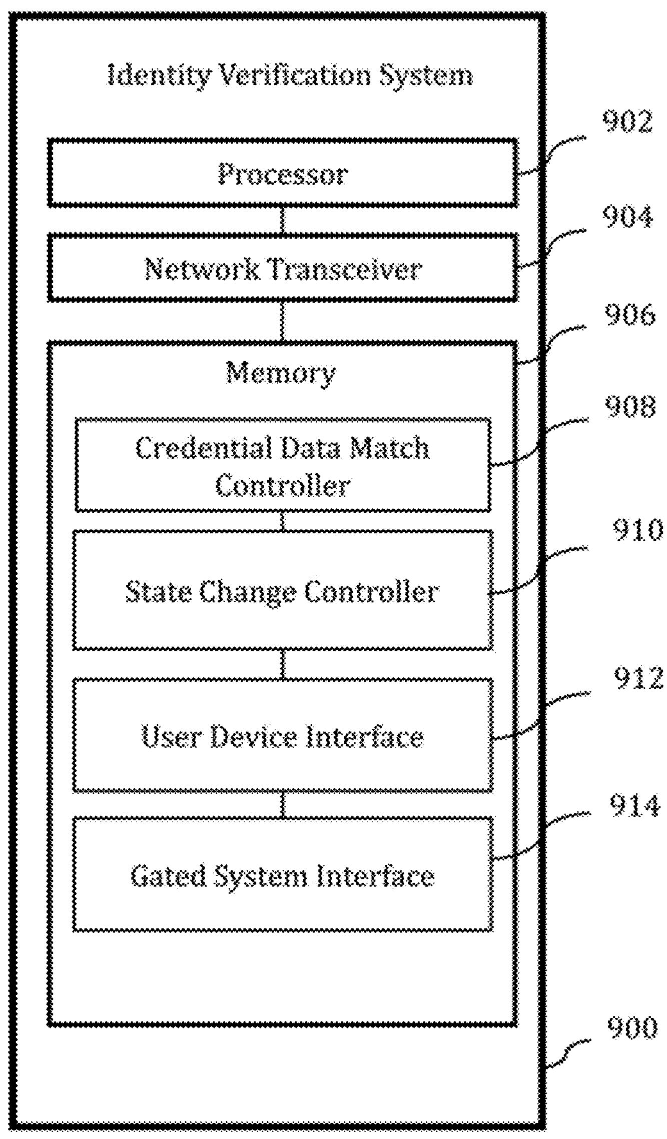
FIG. 9 illustrates an embodiment of an identity verification system configured for implementing the teachings of the present invention.

FIG. 9 illustrates an embodiment of an identity verification system 900 configured for implementing the teachings of the present invention. In various embodiments, identity verification system 900 may be implemented within, or external to, user device 202, 800.

Identity verification system 900 may comprise any processor implemented instance of any processor based electronic communication device or communication terminal that is configured to implement data processing functionality, network communication functionality and/or wireless communication functionality, and one or more of the method steps described above in connection with FIGS. 3, 4 and 7 described above. Identity verification system 900 comprises a processor 902, network transceiver 904 and memory 906, which memory 906 may include transitory memory and/or non-transitory memory. In an exemplary embodiment, memory 906 may have stored therewithin one or more of, (i) an operating system (not shown) configured for managing device hardware and software resources and that provides common services for software programs implemented within identity verification system 900, (ii) a credential data match controller 908 configured for performing step 702 of the method of FIG. 7, and/or validating cryptographic proofs or assertions received from the user device (iii) a state change controller 910 configured for performing step 706 of the method of FIG. 7, (iv) a user device interface 912, which enables identity verification system 900 to communicate with a user device 202, 800 for the purposes of implementing one or more methods of the present invention (for example the methods of any of FIGS. 3 to 7) and (v) gated system interface 914, which enables identity verification system 900 to communicate with a gated system 206 for the purposes of implementing one or more methods of the present invention (for example the methods of any of FIGS. 3, 4 and 7).

Figure 10:
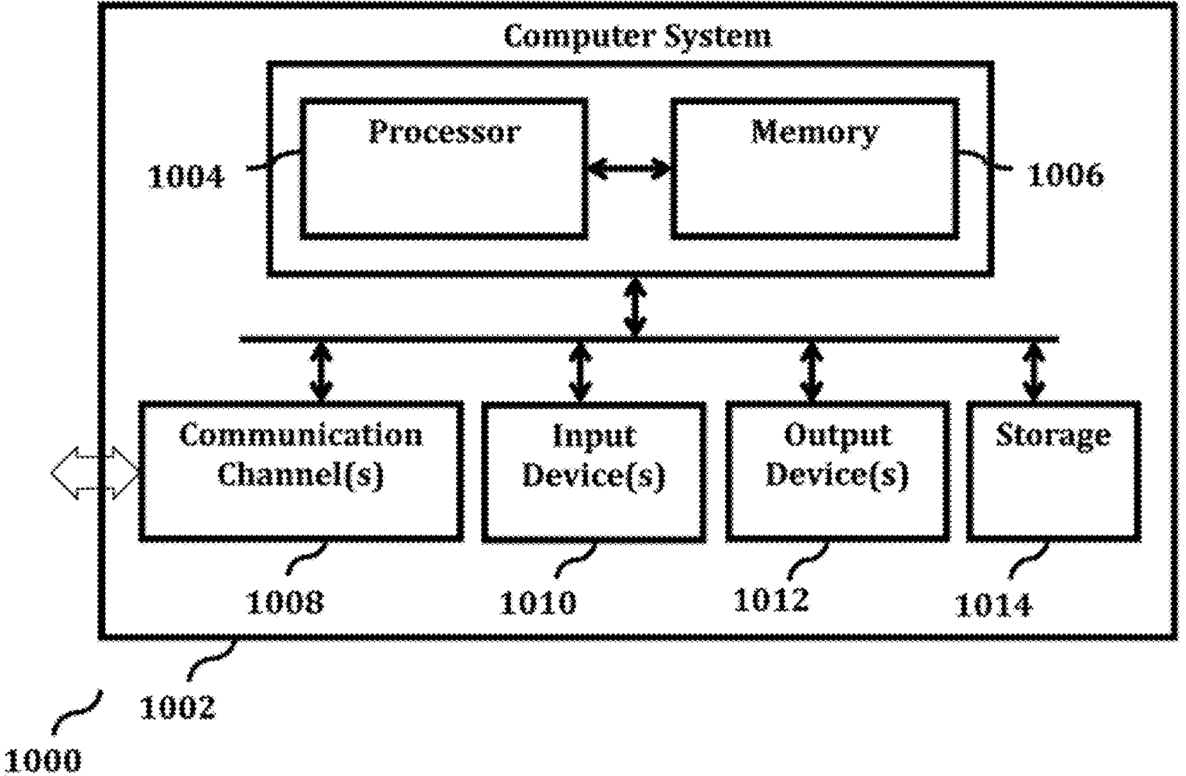
FIG. 10 illustrates an exemplary computing system of a type within which one or more methods, method steps or features of the present invention may be implemented.

FIG. 10 illustrates an exemplary computing system of a type within which one or more methods, method steps or features of the present invention may be implemented.

FIG. 10 illustrates an exemplary computing system 1000 of a type within which one or more methods, method steps or features of the present invention may be implemented. The illustrated computing system 1000 comprises computer system 1002 which in turn comprises one or more processors 1004 and at least one memory 1006. Processor 1004 is configured to execute program instructions- and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device.

The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly provides systems and methods for verifying the live, real-time presence of an individual as the rightful bearer of a trusted credential (i.e. one or more data objects associated uniquely with an individual and containing identity and attribute information relating to that individual, which has been generated by a trusted credential system), by matching live biometric data from the individual against biometric reference data contained within that trusted credential.

The trusted credential may include biometric reference data, cryptographically bound by a digital signature from a trusted external authority (such as the trusted credential system), which ensures its authenticity and resistance to tampering. Even when only certain identity attributes are to be confirmed, the methods and systems of the present invention perform a live biometric match to ensure that those attributes belong to and are being released with the positive knowledge and consent of, the rightful holder of the trusted credential. In preferred embodiments, verification of the trusted credential's authenticity is performed entirely on the user's device, using public keys or trust anchors obtained independently of the verification event, such that no real-time contact with the issuing authority or trusted credential system is required.

Upon a successful verification of the authenticity of the trusted credential, the systems and methods of the present invention generate a cryptographically signed proof of presence. This proof may include or be contingent upon data derived from the credential, such as confirmation of specific attributes, pseudonymous identifiers, or cryptographic tokens. The proof is portable, self-contained, and verifiable by any party without requiring communication with the credential issuer or any central authority. In preferred embodiments, the proof is bound to a particular context or transaction via cryptographic linkage to context-specific inputs, such as a computing system identifier, a nonce, a session identifier, a timestamp, a device identifier, a geographic location, or a network address. In an embodiment, a computing system identifier may include a domain name, company name, or an identifier of the company associated with the computing system.

Dependent embodiments of the above include, but are not limited to: generating zero-knowledge proofs that reveal no personal data while confirming the satisfaction of a verifier's conditions; issuing pseudonymous but continuous identifiers that preserve identity continuity without revealing underlying identity; releasing stored keys, credentials, or authentication tokens only upon verified presence; and binding verification to secure sessions in standard identity protocols such as OAuth, SAML, and OIDC.

The architecture implemented by the present invention inverts the traditional trust model. Instead of a central service authenticating the user, the user proves themselves to the service—using a trusted credential, live biometric matching, and device attestation—without exposing the underlying data. Unlike mobile wallets, mDL, and ePassport implementations that transmit personal data to entities the user may not know or control, the invention enables verification without disclosure, preventing the creation of data trails or honeypots. Unlike centralized systems such as CLEAR™ or Amazon One™, the solutions of the present invention do not require verifiers to integrate with or trust a single provider, eliminating single points of failure and enabling global interoperability.

Further, the systems of the present invention are platform-like in nature: the proof of presence can be used anywhere, verified by anyone, without special integration, and can carry various forms of cryptographic assurance—from simple presence confirmation to complex attribute-based access decisions—all without compromising privacy or decentralization. By unifying authoritative credential verification, biometric presence confirmation, and verifier-agnostic proof generation into a single, portable process, the invention establishes a new category of digital identity primitive. This combination, though made from mature individual technologies, produces a decentralized, privacy-preserving verification model that prior art did not teach or suggest, because industry practice assumed such assurance required central orchestration. In effect, it digitizes the act of "showing up" with the same assurance as physical-world checks—instantly, privately, and without revealing anything beyond what the verifier truly needs to know. In doing so, the invention makes possible the secure, privacy-preserving digitization of interactions that have historically required physical presence, from account recovery and notarizations to high-value authorizations and eligibility checks, in a manner not achievable in prior art.

In preferred embodiments, the invention functions as a general-purpose verification platform rather than a single-purpose identity tool. A single, portable proof of presence—generated entirely on the user's device—can carry multiple forms of cryptographic assurance in the same framework, including: (a) verifier-scoped user identifiers derived from authoritative attributes for first-time account binding; (b) high-entropy document identifiers for credential continuity; (c) pseudonymous identifiers unlinkable across verifiers for privacy-preserving continuity; and (d) selectively disclosed attributes or zero-knowledge attestations to verifier-defined conditions. This enables the same architecture to support a broad range of use cases: direct identity binding (e.g., "this is Jane Doe, account #1234"), selective attribute assertions ("over 21," "licensed in jurisdiction X"), presence-gated credential release, credentialed signing and notarization, jurisdiction or role-based access, marketplace trust, session-bound transaction approvals, and cross-domain account linking. A common challenge format, such as a QR-code or link, allows any relying party to initiate a verification without bespoke integration, with the proof containing everything needed for that party to interpret results according to its own policy. This unification of authoritative credential verification, live biometric confirmation, selective disclosure, and verifier-agnostic proof generation into a reusable primitive is not suggested by prior art, which has consistently treated these capabilities as separate or centrally orchestrated.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein- and in a particular embodiment specifically contemplated, is intended to be practiced in the absence of any element which is not specifically disclosed herein.

We claim:

1. A computer-implemented method for initiating a state change in a device or system based on both non-biometric identity attribute information and verified live presence of an individual, the method comprising, performing at a computing system, the steps of:

obtaining a set of information, wherein the set of information comprises or is derived from a set of transmission data that has been transmitted from a user device subsequent to performance of the steps of:

(a) obtaining at the user device, a set of credential data associated with the individual, wherein the set of credential data comprises biometric data associated with the individual and at least one non-biometric identity attribute of the individual, and wherein authenticity of the set of credential data is verifiable using a first digital signature provided by a trusted entity;

(b) obtaining at the user device, the first digital signature provided by the trusted entity, wherein the first digital signature has been generated by cryptographically signing the biometric data or a subset thereof or data derived therefrom, and the at least one non-biometric identity attribute or a subset thereof or data derived therefrom;

(c) obtaining at the user device, live biometric sample data, wherein the live biometric sample data is obtained or derived from a biometric sample acquired from the individual using a biometric sample acquisition sensor that is operated by or controlled by or communicably coupled with the user device;

(d) comparing the live biometric sample data with reference biometric data, wherein the reference biometric data comprises any of (i) biometric data within the set of credential data obtained at step (a), or (ii) biometric data that is verifiably linked with or derived from the biometric data within the set of credential data obtained at step (a);

(e) transmitting the set of transmission data to the computing system, wherein:

the set of transmission data includes, is derived from, or has been generated based on the at least one non-biometric identity attribute or based on an attribute-level assertion derived from the at least one non-biometric identity attribute, within the set of credential data;

and initiating the state change in a device or a system, wherein the state change is conditioned upon, or a changed state arising from the state change is based on:

(f) a determination that the set of information satisfies one or more predefined credential data requirements, wherein at least one of the predefined credential data requirements is satisfied based on the at least one non-biometric identity attribute or based on an attribute-level assertion derived from the at least one non-biometric identity attribute;

(g) a positive result from verification of authenticity of any data from the set of credential data, wherein the verification is performed using the first digital signature; and (h) a positive biometric match result based on step (d).

2. The method of claim 1, wherein the user device generates a second digital signature by cryptographically signing a second set of data, and wherein the change in the state is further conditioned upon, or the changed state arising from the state change is further based on, a positive verification result of the second digital signature, and wherein the set of information comprises the second digital signature.

3. The method of claim 2, wherein the second set of data is based on, derived from, or contingent upon any data from the set of credential data or the first digital signature.

4. The method of claim 2, wherein the second digital signature is generated using a cryptographic key associated by an attestation service with the user device or with an application implemented on the user device, and wherein initiating the state change is further conditioned upon, or the changed state arising from the state change is further based on, a verification of authenticity of the cryptographic key using attestation data associated with the user device or the application, the attestation data being issued, certified, or endorsed by an entity independent from the computing system.

5. The method of claim 1, wherein the initiation of the state change is further conditioned upon, or the changed state arising from the state change is further based on:

(i) the user device, or an application thereon, proving control of an attested cryptographic key by correctly performing a cryptographic operation, and on verification of said key using attestation data; or (ii) a result of a secure multiparty computation performed based on (a) the set of credential data obtained at the user device or a derivative thereof, and (b) a set of reference data accessible in a computer system distinct from the user device or a derivative thereof, wherein the result is conditioned upon, or indicative of, a match between the credential data and the reference data.

6. The method of claim 1, wherein:

the trusted entity comprises any of a governmental entity, a national identity provider, a state agency, a financial institution, an educational institution, a healthcare provider, a private enterprise, or an identity provider; and the first digital signature has been generated by cryptographically signing data included in any of an electronic passport, a mobile driver's license (mDL), a national identity card, a government-issued employee or contractor credential, a photo identification credential, a verifiable credential, a decentralized identifier (DID), or a QR-code-based identity credential.

7. The method of claim 1, wherein:

the set of information is restricted for use within one or more specific contexts by cryptographically binding the set of information to one or more context-specific inputs, each context-specific input comprising any of a computing system identifier, a challenge value, a nonce, a session identifier, a timestamp, a device identifier, a geographic location, or a network address.

8. The method of claim 1, wherein the set of information comprises, or is generated using, one or more of:

(a) an identity attribute, an attribute-level assertion, or a pseudonymous identifier, including a pseudonymous identifier that supports continuity across multiple interactions;

(b) data representing a scope of access, permission, or eligibility associated with the individual or the user device, said data comprising any of an access token, authentication token, authorization code, a cryptographic key, account identifier, passkey, or payment credential, or credentials or one or more keys previously stored on the user device and released conditionally based on user intent or policy;

(c) a cryptographic proof, comprising a zero-knowledge proof of possession or control of a credential, attribute, or identity assertion, wherein said cryptographic proof omits or masks the credential, attribute, or identity;

(d) a biometrically-derived identifier or other user-associated data accessible to the user device;

(e) a selectively disclosed subset of the credential data initially obtained at the user device, wherein selective disclosure of said subset of the credential data is performed based on a request, policy, or user preference; and (f) a verifiable assertion, token, or credential formatted for compatibility with one or more standard authentication, authorization, or identity verification protocols.

9. The method of claim 1, further comprising, performing at the computing system or an associated authorization system, the steps of:

(a) receiving the set of information;

(b) verifying the authenticity of the information, including verifying at least one of: a cryptographic signature, attestation data, or a cryptographic proof of possession of a credential;

(c) determining, based on the verified information, whether to grant access to a resource, authorize a transaction, complete a digital interaction, or trigger a contextual action; and (d) in response to a positive determination based on the verified information, performing one or more of:

(i) causing a client interface associated with the individual to navigate to, or activate, one or more resources, services, transactions, application states, or interactions;

(ii) processing a payment or transaction;

(iii) permitting access to gated content, services, or systems;

(iv) recording a notarized, signed, or otherwise verified digital action; and (v) linking or activating an account, credential, or verified identity state, including during account creation or upon receipt of the information;

wherein the state change is initiated in response to an input, trigger, or contextual condition, the input, trigger, or contextual condition including any of scanning a code, tapping a link, responding to a notification, or interacting with a physical interface, wherein the input, trigger or condition facilitates or requests use of the set of information.

10. The method of claim 1, wherein the state change or the changed state arising from the state change is conditioned upon confirming one or both of integrity, and association between, the biometric data and the at least one non-biometric identity attribute, the confirming involving verification of the first digital signature.

11. A system for initiating a state change in a device or system based on both non-biometric identity attribute information and verified live presence of an individual, the system comprising a computing system comprising a memory and a processor, wherein the computing system is configured to perform the steps of:

obtaining a set of information, wherein the set of information comprises or is derived from a set of transmission data that has been transmitted from a user device subsequent to performance of the steps of:

(a) obtaining at the user device, a set of credential data associated with the individual, wherein the set of credential data comprises biometric data associated with the individual and at least one non-biometric identity attribute of the individual, and wherein authenticity of the set of credential data is verifiable using a first digital signature provided by a trusted entity;

(b) obtaining at the user device, the first digital signature provided by the trusted entity, wherein the first digital signature has been generated by cryptographically signing the biometric data or a subset thereof or data derived therefrom, and the at least one non-biometric identity attribute or a subset thereof or data derived therefrom;

(c) obtaining at the user device, live biometric sample data, wherein the live biometric sample data is obtained or derived from a biometric sample acquired from the individual using a biometric sample acquisition sensor that is operated by or controlled by or communicably coupled with the user device;

(d) comparing the live biometric sample data with reference biometric data, wherein the reference biometric data comprises any of (i) biometric data within the set of credential data obtained at step (a), or (ii) biometric data that is verifiably linked with or derived from the biometric data within the set of credential data obtained at step (a);

(e) transmitting the set of transmission data to the computing system, wherein:

the set of transmission data includes, is derived from, or has been generated based on the at least one non-biometric identity attribute or based on an attribute-level assertion derived from the at least one non-biometric identity attribute, within the set of credential data;

and initiating the state change in a device or a system, wherein the state change is conditioned upon, or a changed state arising from the state change is based on:

(f) a determination that the set of information satisfies one or more predefined credential data requirements, wherein at least one of the predefined credential data requirements is satisfied based on the at least one non-biometric identity attribute or based on an attribute-level assertion derived from the at least one non-biometric identity attribute;

(g) a positive result from verification of authenticity of any data from the set of credential data, wherein the verification is performed using the first digital signature; and (h) a positive biometric match result based on step (d).

12. The system of claim 11, wherein the user device generates a second digital signature by cryptographically signing a second set of data, and wherein the change in the state is further conditioned upon, or the changed state arising from the state change is further based on, a positive verification result of the second digital signature, and wherein the set of information comprises the second digital signature.

13. The system of claim 12, wherein the second set of data is based on, derived from, or contingent upon any data from the set of credential data or the first digital signature.

14. The system of claim 11, wherein the second digital signature is generated using a cryptographic key associated by an attestation service with the user device or with an application implemented on the user device, and wherein initiating the state change is further conditioned upon, or the changed state arising from the state change is further based on, a verification of authenticity of the cryptographic key using attestation data associated with the user device or the application, the attestation data being issued, certified, or endorsed by an entity independent from the computing system.

15. The system of claim 12, wherein the computing system is configured such that the initiation of the state change is further conditioned upon, or the changed state arising from the state change is further based on:

(i) the user device, or an application thereon, proving control of an attested cryptographic key by correctly performing a cryptographic operation, and verification of said key using attestation data; or (ii) a result of a secure multiparty computation performed based on (a) the set of credential data obtained at the user device or a derivative thereof, and (b) a set of reference data accessible in a computer system distinct from the user device or a derivative thereof, wherein the result is conditioned upon, or indicative of, a match between the credential data and the reference data.

16. The system of claim 11, wherein:

the trusted entity comprises any of a governmental entity, a national identity provider, a state agency, a financial institution, an educational institution, a healthcare provider, a private enterprise, or an identity provider; and the first digital signature has been generated by cryptographically signing data included in any of an electronic passport, a mobile driver's license (mDL), a national identity card, a government-issued employee or contractor credential, a photo identification credential, a verifiable credential, a decentralized identifier (DID), or a QR-code-based identity credential.

17. The system of claim 11, wherein:

the set of information is restricted for use within one or more specific contexts by cryptographically binding the set of information to one or more context-specific inputs, each context-specific input comprising any of a computing system identifier, a challenge value, a nonce, a session identifier, a timestamp, a device identifier, a geographic location, or a network address.

18. The system of claim 11, wherein the set of information comprises, or is generated using, one or more of:

(a) an identity attribute, an attribute-level assertion, or a pseudonymous identifier, including a pseudonymous identifier that supports continuity across multiple interactions;

(b) data representing a scope of access, permission, or eligibility associated with the individual or the user device, said data comprising any of an access token, authentication token, authorization code, a cryptographic key, account identifier, passkey, or payment credential, or credentials or one or more keys previously stored on the user device and released conditionally based on user intent or policy;

(c) a cryptographic proof, comprising a zero-knowledge proof of possession or control of a credential, attribute, or identity assertion, wherein said cryptographic proof omits or masks the credential, attribute, or identity;

(d) a biometrically-derived identifier or other user-associated data accessible to the user device;

(e) a selectively disclosed subset of the credential data initially obtained at the user device, wherein selective disclosure of said subset of the credential data is performed based on a request, policy, or user preference; and (f) a verifiable assertion, token, or credential formatted for compatibility with one or more standard authentication, authorization, or identity verification protocols.

19. The system of claim 11, wherein the computing system or an associated authorization system is configured to perform the steps of:

(a) receiving the set of information;

(b) verifying the authenticity of the information, including verifying at least one of: a cryptographic signature, attestation data, or a cryptographic proof of possession of a credential;

(c) determining, based on the verified information, whether to grant access to a resource, authorize a transaction, complete a digital interaction, or trigger a contextual action; and (d) in response to a positive determination based on the verified information, performing one or more of:

(i) causing a client interface associated with the individual to navigate to, or activate, one or more resources, services, transactions, application states, or interactions;

(ii) processing a payment or transaction;

(iii) permitting access to gated content, services, or systems;

(iv) recording a notarized, signed, or otherwise verified digital action; and (v) linking or activating an account, credential, or verified identity state, including during account creation or upon receipt of the information;

wherein the state change is initiated in response to an input, trigger, or contextual condition, the input, trigger, or contextual condition including any of scanning a code, tapping a link, responding to a notification, or interacting with a physical interface, wherein the input, trigger or condition facilitates or requests use of the set of information.

20. The system of claim 11, wherein the computing system is configured such that the state change or the changed state arising from the state change is conditioned upon confirming one or both of integrity, and association between, the biometric data and the at least one non-biometric identity attribute, the confirming involving verification of the first digital signature.

21. A computer program product for initiating a state change in a device or system based on both non-biometric identity attribute information and verified live presence of an individual, the computer program product comprising a non-transitory computer usable medium having a computer readable program code embodied therein, the computer readable program code comprising instructions for performing at a computing system, the steps of:

obtaining a set of information, wherein the set of information comprises or is derived from a set of transmission data that has been transmitted from a user device subsequent to performance of the steps of:

(a) obtaining at the user device, a set of credential data associated with the individual, wherein the set of credential data comprises biometric data associated with the individual and at least one non-biometric identity attribute of the individual, and wherein authenticity of the set of credential data is verifiable using a first digital signature provided by a trusted entity;

(b) obtaining at the user device, the first digital signature provided by the trusted entity, wherein the first digital signature has been generated by cryptographically signing the biometric data or a subset thereof or data derived therefrom, and the at least one non-biometric identity attribute or a subset thereof or data derived therefrom;

(c) obtaining at the user device, live biometric sample data, wherein the live biometric sample data is obtained or derived from a biometric sample acquired from the individual using a biometric sample acquisition sensor that is operated by or controlled by or communicably coupled with the user device;

(d) comparing the live biometric sample data with reference biometric data, wherein the reference biometric data comprises any of (i) biometric data within the set of credential data obtained at step (a), or (ii) biometric data that is verifiably linked with or derived from the biometric data within the set of credential data obtained at step (a);

(e) transmitting the set of transmission data to the computing system, wherein:

the set of transmission data includes, is derived from, or has been generated based on the at least one non-biometric identity attribute or based on an attribute-level assertion derived from the at least one non-biometric identity attribute, within the set of credential data;

and initiating the state change in a device or a system, wherein the state change is conditioned upon, or a changed state arising from the state change is based on:

(f) a determination that the set of information satisfies one or more predefined credential data requirements, wherein at least one of the predefined credential data requirements is satisfied based on the at least one non-biometric identity attribute or based on an attribute-level assertion derived from the at least one non-biometric identity attribute;

(g) a positive result from verification of authenticity of any data from the set of credential data, wherein the verification is performed using the first digital signature; and (h) a positive biometric match result based on step (d).

* * * * *